US012792949B2

(12) United States Patent
Teoh et al.

(10) Patent No.: US 12,792,949 B2
(45) Date of Patent: Nov. 10, 2026

(54) MEASUREMENT-BASED FAULT TOLERANT ARCHITECTURE FOR THE 4-LEGGED CAT CODE

(71) Applicant: Yale University, New Haven, CT (US)

(72) Inventors: James Teoh, New Haven, CT (US); Neel Thakur, New Haven, CT (US); Benjamin Chapman, Seattle, WA (US); Stijn de Graaf, New Haven, CT (US); Steven M. Girvin, Hamden, CT (US); Shruti Puri, Cheshire, CT (US); Robert J. Schoelkopf, III, Madison, CT (US)

(73) Assignee: Yale University, New Haven, CT (US)

( * ) Notice: Subject to any disclaimer, the term of this patent is extended or adjusted under 35 U.S.C. 154(b) by 0 days.

(21) Appl. No.: 18/722,909

(22) PCT Filed: Dec. 22, 2022

(86) PCT No.: PCT/US2022/053816
§ 371 (c)(1),
(2) Date: Jun. 21, 2024

(87) PCT Pub. No.: WO2023/191872
PCT Pub. Date: Oct. 5, 2023

(65) Prior Publication Data

US 2025/0061366 A1 Feb. 20, 2025
US 2025/0356232 A9 Nov. 20, 2025

Related U.S. Application Data

(60) Provisional application No. 63/293,034, filed on Dec. 22, 2021.

(51) Int. Cl.
*G06N 10/40* (2022.01)
*G06N 5/04* (2023.01)
*G06N 10/70* (2022.01)

(52) U.S. Cl.
CPC ............. *G06N 10/40* (2022.01); *G06N 10/70* (2022.01)

(58) Field of Classification Search
None
See application file for complete search history.

(56) References Cited

U.S. PATENT DOCUMENTS

2009/0079421 A1 3/2009 Freedman et al.
2010/0148853 A1 6/2010 Harris et al.
(Continued)

FOREIGN PATENT DOCUMENTS

CA 3 004 750 A1 9/2017
CN 108290733 A 7/2018
(Continued)

OTHER PUBLICATIONS

Hastrup, Continuous-Variable Quantum Codes for Fault-Tolerant Quantum Information Processing, Doctoral Thesis, Department of Physics, Technical University of Denmark, pp. 1-157, Aug. 2021 (Year: 2021).*
(Continued)

*Primary Examiner* — Wilbert L Starks
(74) *Attorney, Agent, or Firm* — Wolf, Greenfield & Sacks, P.C.

(57) ABSTRACT

Systems and methods for performing fault tolerant quantum operations for the 4-legged cat code are provided. The quantum systems include an ancilla qubit dispersively coupled to a first logical qubit, and the quantum system may be operated at least in part by: generating and applying a first drive waveform to the ancilla qubit, the first drive waveform comprising a first comb of 7t-pulses having selective frequencies corresponding to a first selection of even and odd cavity resonance frequencies of the first logical qubit; and reading out a state of the ancilla qubit.

17 Claims, 24 Drawing Sheets

(56) References Cited

U.S. PATENT DOCUMENTS

| | | | |
|---|---|---|---|
| 2010/0251049 A1 | 9/2010 | Goto et al. |
| 2014/0297708 A1 | 10/2014 | Svore et al. |
| 2017/0308803 A1 | 10/2017 | Wallman et al. |
| 2019/0385088 A1 | 12/2019 | Naaman et al. |
| 2020/0242500 A1 | 7/2020 | Girvin et al. |
| 2020/0334104 A1 | 10/2020 | Rosenblum et al. |
| 2025/0036996 A1 | 1/2025 | Puri et al. |

FOREIGN PATENT DOCUMENTS

| | | |
|---|---|---|
| CN | 108698815 A | 10/2018 |
| WO | WO 2020/198581 A1 | 10/2020 |

OTHER PUBLICATIONS

Wang, et al., Quantum-Enhanced Radiometry via Approximate Quantum Error Correction, arXiv:2103.10281v2 [quant-ph] Mar. 19, 2021, pp. 1-8 (Year: 2021).*
Ma, et al., Quantum Control of Bosonic Modes with Superconducting Circuits, Science Bulletin, vol. 66, Issue 17, pp. 1789-1805, Sep. 15, 2021 (Year: 2021).*
Fabre, Quantum information in time-frequency continuous variables, Physics [physics]. Université Paris Cité, pp. 1-239, Feb. 11, 2020 (Year: 2020).*
Reinhold, Controlling Error-Correctable Bosonic Qubits, Doctoral Thesis, Yale University, pp. 1-268, Dec. 2019 (Year: 2019).*
U.S. Appl. No. 18/716,891, filed Jun. 5, 2024, Puri et al..
PCT/US2022/051990, May 23, 2023, International Search Report and Written Opinion.
PCT/US2022/053816, Nov. 20, 2023, International Search Report and Written Opinion.
International Search Report and Written Opinion for International Application No. PCT/US2022/051990, mailed May 23, 2023.
International Search Report and Written Opinion for International Application No. PCT/US2022/053816, mailed Nov. 20, 2023.
Awschalom et al., Development of quantum interconnects (quics) for next-generation information technologies. Prx Quantum. Feb. 1, 2021;2(1):017002-1-21.
Cai et al., Bosonic quantum error correction codes in superconducting quantum circuits. Fundamental Research. arXiv:2010.08699. Oct. 17, 2020:1-23.
Chamberland et al., Fault-tolerant quantum circuits with much lower overhead: New approach reduces the number of ancillary qubits required to implement the crucial T gate by at least an order of magnitude. Amazon Science. Dec. 15, 2020:1-6.
Claes et al., Bias-preserving cluster states for high-threshold quantum information processing. Yale Univ., Department of Applied Physics. Dec. 6, 2021;8 pages.
Claes et al., Tailored cluster states with high threshold under biased noise. arXiv:2201.10566v1. Jan. 25, 2022;1-17.
Claes et al., Tailored cluster states with high threshold under biased noise. npj Quantum Information. Jan. 31, 2023;9(1):1-12.
Hu et al., Demonstration of quantum error correction and universal gate set on a binomial bosonic logical qubit. Nature Physics. May 2019;15(5):503-8.
Krastanov et al., Universal control of an oscillator with dispersive coupling to a qubit. Physical Review A. Oct. 21, 2015;92(4):040303.
Ma et al., Quantum control of bosonic modes with superconducting circuits. Science Bulletin. Sep. 15, 2021;66(17):1789-805.
Sahay et al., High threshold codes for neutral atom qubits with biased erasure errors. arXiv preprint arXiv:2302.03063. Feb. 6, 2023:1-17.
Sahay et al., Threshold to fusion failure exceeding 1/4 in linear optical quantum computing. Suggestion: Tailoring Fusion-Based Error Correction for High-Thresholds to Biased Fusion- Failures. Yale University. Nov. 14, 2022:1-5.
Yuan et al., Amplification of quantum discord between two uncoupled qubits in a common environment by phase decoherence. Journal of Physics B: Atomic, Molecular and Optical Physics. Aug. 4, 2010;43(16):165503. arxiv: 1005.4204.
International Preliminary Report on Patentability for International Application No. PCT/US2022/051990, mailed Jun. 20, 2024.
International Preliminary Report on Patentability for International Application No. PCT/US2022/053816, mailed Jul. 4, 2024.
Extended European Search Report dated Aug. 21, 2025 in connection with European Application No. 22936022.7.
Gertler et al., Protecting a Bosonic Qubit with Autonomous Quantum Error Correction. Arxiv.Org, Cornell University Library, Oct. 6, 2020:23 pages.
Extended European Search Report dated Oct. 17, 2025 in connection with European Application No. 22905021.6.
Ataides et al., The XZZX surface code. ArXiv:2009.07851v3 [quant-ph]; Apr. 19, 2021. 16 pages.
Darmanwan et al., Practical quantum error correction with the XZZX code and Kerr-cat qubits. arXiv:2104.09539v2 [quant-ph], Oct. 18, 2021. 21 pages.
Horsman et al., Surface code quantum computing by lattice surgery. arXiv:0000.4022v3 [quant-ph], Feb. 21, 2013. 29 pages.
Raussendorf et al., Fault-tolerant quantum computation with high threshold in two dimensions. arXiv:quant-ph/0610082v2, May 14, 2007. 4 pages.

* cited by examiner

MEASUREMENT-BASED FAULT TOLERANT ARCHITECTURE FOR THE 4-LEGGED CAT CODE

CROSS REFERENCE TO RELATED APPLICATIONS

This application claims the benefit under 35 U.S.C. § 119 (e) of U.S. Provisional Patent Application No. 63/293,034, filed Dec. 22, 2021, titled "MEASUREMENT-BASED FAULT TOLERANT ARCHITECTURE FOR THE 4-LEGGED CAT CODE," which is incorporated herein by reference in its entirety.

STATEMENT REGARDING FEDERALLY-SPONSORED RESEARCH

This invention was made with government support under W911NF-18-1-0212 awarded by United States Army Research Office. The government has certain rights in the invention.

BACKGROUND

Quantum information processing techniques perform computations by manipulating one or more quantum objects. These techniques are sometimes referred to as "quantum computing." In order to perform computations, a quantum information processor utilizes quantum objects to reliably store and retrieve information. According to some quantum information processing approaches, a quantum analogue to the classical computing "bit" (being equal to 1 or 0) has been developed, which is referred to as a quantum bit, or "qubit." A qubit can be composed of any quantum system that has two distinct states (which may be thought of as 1 and 0 states), but also has the special property that the system can be placed into quantum superpositions and thereby exist in both of those states at once.

BRIEF SUMMARY

Some embodiments are directed to a method of operating a circuit quantum electrodynamics system comprising an ancilla qubit dispersively coupled to a first logical qubit. The method comprises performing a quantum operation at least in part by: generating and applying a first drive waveform to the ancilla qubit, the first drive waveform comprising a first comb of π-pulses having selective frequencies corresponding to a first selection of even and odd cavity resonance frequencies of the first logical qubit; and reading out a state of the ancilla qubit.

Some embodiments are directed to a quantum information processing system, comprising: an ancilla qubit; a first logical qubit dispersively coupled to the ancilla qubit; and at least one controller configured to perform a quantum operation at least in part by: generating and applying a first drive waveform to the ancilla qubit, the first drive waveform comprising a first comb of π-pulses having selective frequencies corresponding to a first selection of even and odd cavity resonance frequencies of the first logical qubit; and reading out a state of the ancilla qubit.

In some embodiments, the method includes, prior to reading out the state of the ancilla qubit, generating and applying a second drive waveform to the ancilla qubit, the second drive waveform comprising a second comb of π-pulses having selective frequencies corresponding to a second selection of even and odd cavity resonance frequencies of the first logical qubit.

In some embodiments, the first selection comprises the selective frequencies $3\chi$. $4\chi$, $7\chi$, and $8\chi$, and the second selection comprises the selective frequencies $1\chi$, $2\chi$, $5\chi$, and $6\chi$.

In some embodiments, the circuit quantum electrodynamics system further comprises a second logical qubit coupled to the first logical qubit by a first beamsplitter, the method further comprising, prior to reading out the state of the ancilla qubit, applying a third drive waveform to the first beamsplitter to enact a detuned beamsplitter interaction between the first logical qubit and the second logical qubit.

In some embodiments, performing the quantum operation comprises generating a Bell state between the first logical qubit and the second logical qubit.

In some embodiments, enacting the detuned beamsplitter interaction between the first logical qubit and the second logical qubit comprises enacting the detuned beamsplitter interaction between a first cavity resonator and a second cavity resonator.

In some embodiments, generating and applying the first drive waveform comprises generating and applying a microwave waveform.

In some embodiments, generating and applying the first drive waveform comprises generating and applying the first drive waveform to a transmon.

In some embodiments, the method further includes generating a first four-qubit cluster state at least in part by: applying a fourth drive waveform to a second beamsplitter coupling the first logical qubit and a third logical qubit; and applying a fifth drive waveform to a third beamsplitter coupling the second logical qubit to a fourth logical qubit.

In some embodiments, the method further includes generating a many-qubit cluster state at least in part by: applying a sixth drive waveform to a fourth beamsplitter coupling the first logical qubit of the first four-qubit cluster state and a first logical qubit of a second four-qubit cluster state.

Some embodiments are directed to a method of operating a circuit quantum electrodynamics system comprising an ancilla qubit dispersively coupled to a first logical qubit and a second logical qubit coupled to the first logical qubit by a first beamsplitter. The method comprises: applying a first drive waveform to the ancilla qubit, the first drive waveform comprising a $\pi/2$ pulse; applying a second drive waveform to the first beamsplitter to enact a detuned beamsplitter interaction between the first logical qubit and the second logical qubit; applying a third drive waveform to the ancilla qubit, the third drive waveform comprising a $\pi/2$ pulse; and reading out a state of the ancilla qubit.

In some embodiments, the circuit quantum electrodynamics system further includes a third logical qubit coupled to the first logical qubit by a second beamsplitter, and the method further comprises: after applying the second drive waveform, applying a fourth drive waveform to the second beamsplitter to enact a detuned beamsplitter interaction between the first logical qubit and the third logical qubit.

Some embodiments are directed to a method of operating a circuit quantum electrodynamics system that includes a first ancilla qubit dispersively coupled to a first logical qubit and a second ancilla qubit dispersively coupled to a second logical qubit, the first logical qubit coupled to the second logical qubit by a first beamsplitter. The method comprises: applying a first drive waveform to the first beamsplitter to enact an on-resonance beamsplitter interaction between the first logical qubit and the second logical qubit; and determining whether at least one of the first and second logical qubits is in a vacuum state by: applying a second drive waveform to the first ancilla qubit to measure a state of the first logical qubit; and applying a third drive waveform to the second ancilla qubit to measure a state of the second logical qubit.

Some embodiments are directed to a method of operating a circuit quantum electrodynamics system that includes a first ancilla qubit dispersively coupled to a first logical qubit, a second ancilla qubit dispersively coupled to a second logical qubit, and a third logical qubit, the first logical qubit and the second logical qubit being coupled by a first beamsplitter and the second logical qubit and the third logical qubit being coupled by a second beamsplitter. The method comprises: preparing an arbitrary logical state in the first logical qubit; preparing a Bell state between the second logical qubit and the third logical qubit; and performing error correction on the arbitrary logical state by teleporting the arbitrary logical state from the first logical qubit to the third logical qubit, the teleporting comprising: using the first beamsplitter to introduce interference between the first logical qubit and the second logical qubit; and after using the first beamsplitter, performing at least one measurement of a state of the first logical qubit and the second logical qubit using the first ancilla qubit and the second ancilla qubit.

In some embodiments, preparing the Bell state comprises: preparing a first coherent state in the second logical qubit; preparing a second coherent state in the third logical qubit; and performing a series of joint parity measurements on the second logical qubit and the third logical qubit.

Some embodiments are directed to a circuit quantum electrodynamics system, comprising: an ancilla qubit; and a plurality of logical qubits, comprising: a first logical qubit dispersively coupled to the ancilla qubit; and a second logical qubit coupled to the first logical qubit by a beamsplitter.

In some embodiments, the ancilla qubit comprises a transmon qubit.

In some embodiments, the second logical qubit comprises a plurality of logical qubits.

In some embodiments, logical qubits of the plurality of logical qubits comprise bosonic modes.

In some embodiments, the system further comprises at least one controller configured to: prepare an arbitrary logical state in the first logical qubit; prepare a Bell state between the second logical qubit and the third logical qubit; and perform error correction on the arbitrary coherent state by teleporting the arbitrary logical state from the first logical qubit to the third logical qubit, the teleporting comprising: using the at least one beamsplitter to introduce interference between the logical qubit and the second logical qubit; and after using the at least one beamsplitter, performing at least one measurement of a state of the first logical qubit and the second logical qubit using the first ancilla qubit and the second ancilla qubit.

BRIEF DESCRIPTION OF THE DRAWINGS

Various aspects and embodiments are described with reference to the following drawings. The drawings are not necessarily drawn to scale. For the purposes of clarity, not every component may be labeled in every drawing. In the drawings.

DETAILED DESCRIPTION

Figure 1:
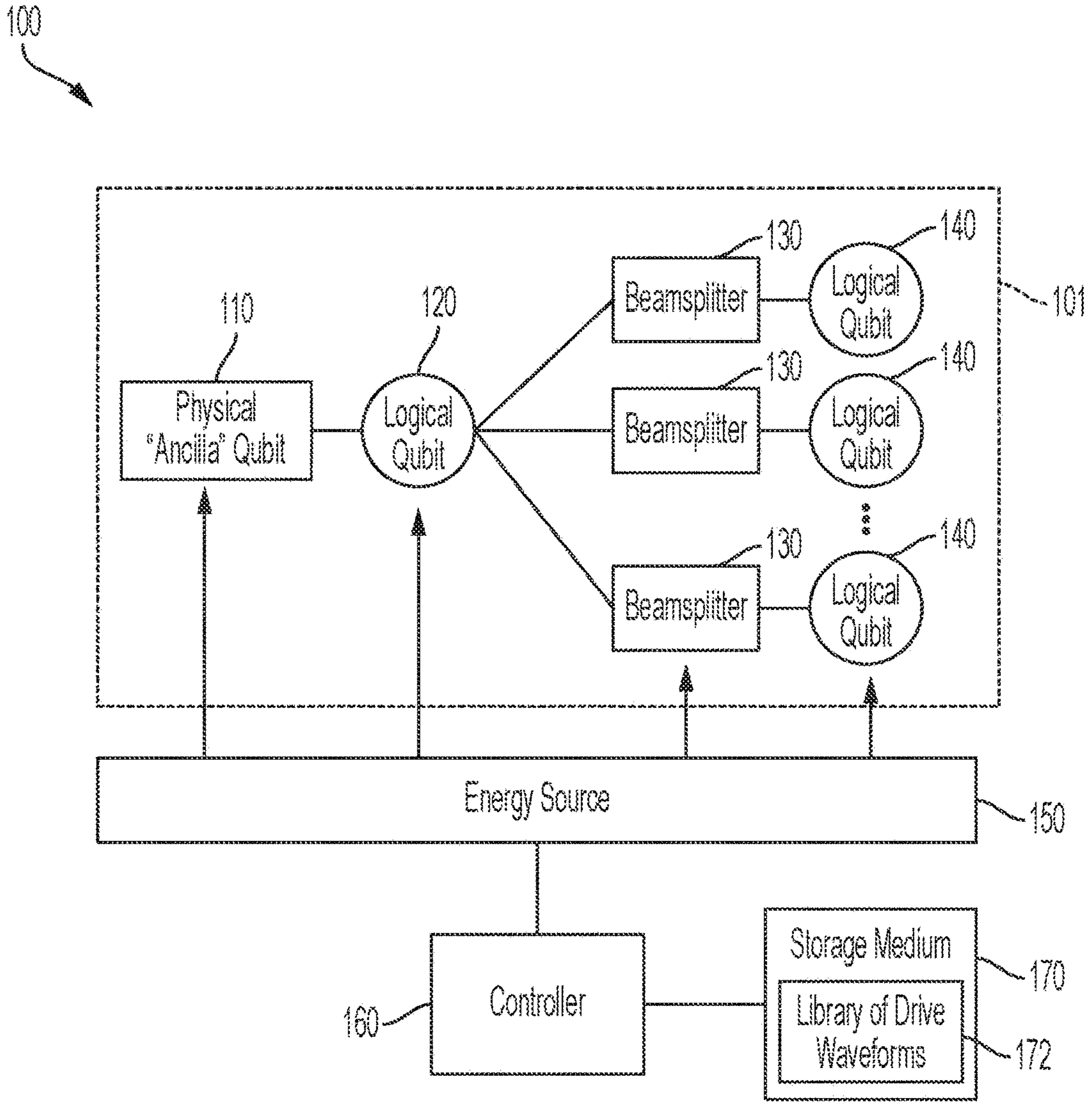
FIG. 1 is a schematic diagram of an illustrative quantum information processing system, in accordance with some embodiments of the technology described herein.

Several different types of qubits have been successfully demonstrated in the laboratory. However, the lifetime of the states of many of these systems before information is lost due to decoherence of the quantum state, or to other quantum noise, is currently around ~100 μs. Notwithstanding longer lifetimes, it may be important to provide error correction techniques in quantum computing that enable reliable storage and retrieval of information stored in a quantum system. However, unlike a classical computing system in which bits can be copied for purposes of error correction, it may not be possible to clone an unknown state of a quantum system. The system may, however, be entangled with other quantum systems which effectively spreads the information in the system out over several entangled objects.

The present application relates to an improved quantum error correction technique for correcting errors in the state of a quantum system exhibiting one or more bosonic modes. An "error" in this context refers to a change in the state of the quantum system that may be caused by, for instance, boson losses, boson gains, dephasing, time evolution of the system, etc., and which alters the state of the system such that the information stored in the system is altered.

As discussed above, quantum multi-level systems such as qubits exhibit quantum states that, based on current experimental practices, decohere in around ~100 μs. It may therefore be beneficial to couple a multi-level system to another system that exhibits much longer decoherence times. As will be described below, bosonic modes are particularly desirable for coupling to a multi-level system. Through this coupling, the multi-level system's state may be represented by the bosonic mode(s) instead, thereby maintaining the same information yet in a longer-lived state than would otherwise exist in the multi-level system alone.

Quantum information stored in bosonic modes may nonetheless still have a limited lifetime, such that errors will still occur within the bosonic system. It may therefore be desirable to manipulate a bosonic system when errors in its state occur to effectively correct those errors and thereby regain the prior state of the system. If a broad class of errors can be corrected for, it may be possible to maintain the state of the bosonic system indefinitely (or at least for long periods of time) by correcting for any type of error that might occur.

The fields of cavity quantum electrodynamics (cavity QED) and circuit QED represent one illustrative experimental approach to implement quantum error correction. In these approaches, one or more qubit systems are each coupled to a resonator cavity in such a way as to allow mapping of the quantum information contained in the qubit(s) to and/or from the resonator(s). The resonator(s) generally will have a longer stable lifetime than the qubit(s). The quantum state may later be retrieved in a qubit by mapping the state back from a respective resonator to the qubit.

When a multi-level system, such as a qubit, is mapped onto the state of a bosonic system to which it is coupled, a particular way to encode the qubit state in the bosonic system must be selected. This choice of encoding is often referred to simply as a "code."

As an example, a code might represent the ground state of a qubit using the zero boson number state of a resonator and represent the excited state of a qubit using the one boson number state of the resonator. That is:

$$(\alpha|g\rangle+\beta|e\rangle)\otimes|0\rangle\rightarrow|g\rangle\otimes(\alpha|0\rangle+\beta|1\rangle)$$

where $|g\rangle$ is the ground state of the qubit, $|e\rangle$ is the excited state of the qubit, $\alpha$ and $\beta$ are complex numbers representing the probability amplitude of the qubit being in state $|g\rangle$ or $|e\rangle$, respectively, and $|0\rangle$ and $|1\rangle$ are the zero boson number state and one boson number state of the resonator, respectively. While this is a perfectly valid code, it fails to be robust against many errors, such as boson loss. That is, when a boson loss occurs, the state of the resonator prior to the boson loss may be unrecoverable with this code.

The use of a code can be written more generally as:

$$(\alpha|g\rangle+\beta|e\rangle)\otimes|0\rangle\rightarrow|g\rangle\otimes(\alpha|W_\downarrow\rangle+\beta|W_\uparrow\rangle)$$

where $|W_\downarrow\rangle$ and $|W_\uparrow\rangle$ are referred to as the logical codewords (or simply "codewords"). The choice of a code—equivalently, the choice of how to encode the state of a two-level system (e.g., a qubit) in the state of the bosonic system—therefore includes choosing values for $|W_\downarrow\rangle$ and $|W_\uparrow\rangle$.

When an error occurs, the system's state transforms to a superposition of resulting states, herein termed "error words,"

$$|E_\downarrow^k\rangle$$

and $$|E_\uparrow^k\rangle$$

as follows:

$$\alpha|W_\downarrow\rangle+\beta|W_\uparrow\rangle\rightarrow\alpha|E_\downarrow^k\rangle+\beta|E_\uparrow^k\rangle$$

where the index k refers to a particular error that has occurred. As discussed above, examples of errors include boson loss, boson gain, dephasing, amplitude dampening, etc. In general, the choice of code affects how robust the system is to errors. That is, the code used determines to what extent a prior state can be faithfully recovered when an error occurs. A desirable code would be associated with a broad class of errors for which no information is lost when any of the errors occurs and any quantum superposition of the logical codewords can be faithfully recovered.

One challenge with the above-described approach, however, is that codes may be limited by the lifetime of a non-linear ancilla required for quantum control of the bosonic system. Typically the bosonic system is controlled, and errors in the bosonic system are corrected, through manipulation of an ancilla qubit that is coupled to the bosonic system. This may mean, however, that when an error occurs in the ancilla qubit, error correction of the state of the bosonic system may no longer be possible.

The inventors have recognized and appreciated that the 4-legged cat code may provide a fault tolerant platform for performing quantum computational operations in a hardware-efficient quantum computational system. In particular, the inventors have developed a universal set of operations for the 4-legged cat code based on measurements of the logical qubits and/or the ancilla qubit. This universal gate set retains fault tolerance against the most likely first order errors in the logical qubits and the ancilla qubit, including ancilla decay and dephasing.

The inventors have developed a set of universal operations based on fault tolerant parity operations for bosonic systems. In particular, the inventors have extended the use of fault tolerant parity measurements such that Z, ZZ, and ZZZ logical operators may be measured non-destructively and fault-tolerantly in the 4-legged cat code. The implementation of these logical operators includes a detuned beamsplitter interaction while the ancilla is in a superposition state to measure these operators. In some embodiments, the ZZ and ZZZ operators may be measured even when the ancilla is directly coupled to only one logical qubit of a plurality of logical qubits.

The inventors have further developed methods for preparing Z and X eigenstates, Bell states, and GHZ states in the 4-legged cat code using fault tolerant parity measurements and the extensions discussed above. Additionally, the inventors have further developed methods to perform robust measurements in the Z, X, ZZ and XX logical bases by combining beamsplitters and measurements of the cavity photon number. For example, the implementation of the X measurement uses interference of the logical state with a coherent state using a beamsplitter interaction. Thereafter, a photon-number selective drive waveform is applied to the ancilla qubit to determine whether one of the logical qubits (e.g., the cavities) is in a vacuum state. These measurements are fault tolerant to all orders of transmon decay and dephasing errors, in the sense that overall measurement error can be exponentially suppressed by repeating the measurements and taking a majority vote on the outcomes.

The inventors have further recognized and appreciated that, combined with cavity displacement operations, this set of operators is sufficient for Clifford operations in the 4-legged cat code, whilst maintaining first order fault tolerance to quantum errors. To make this set universal, the inventors have developed an operation including fault tolerant SNAP gates to achieve arbitrary single qubit Z rotations or alternatively, an operation including preparation of high fidelity arbitrary states on the single qubit Bloch sphere through a distillation scheme. This would involve generating N imperfect copies of the target state and comparing the copies pair-wise by performing non-destructive fault tolerant SWAP tests between all possible pairs. Post-selecting on passing all the SWAP tests results in N copies of the states that have a higher fidelity to the target than the initial states.

The inventors have further recognized and appreciated that single photon loss and no-jump backaction may be corrected in the 4-legged cat code through a teleportation scheme ("telecorrection"). This scheme can be split into two parts: the creation of a suitable entangled Bell pair and measurements in the Bell basis. The inventors have accordingly developed techniques for generating a Bell state and performing a Bell measurement for the 4-legged cat code. Such a Bell state is then used to correct for no-jump backaction, and the Bell measurement enacts teleportation whilst simultaneously correcting for single photon loss.

According to some embodiments, the codes described herein may be used to configure a state of a bosonic system. Bosonic systems may be particularly desirable systems in which to apply the techniques described herein, as a single bosonic mode may exhibit equidistant spacing of coherent states. A resonator cavity, for example, is a simple harmonic oscillator with equidistant level spacing. Bosonic modes are also helpful for quantum communications in that they can be stationary for quantum memories or for interacting with conventional qubits, or they can be propagating ("flying") for quantum communication (e.g., they can be captured and released from resonators).

I. Illustrative Hardware Implementations

FIG. 1 depicts an illustrative system 100 suitable for practicing aspects of the present application. In system 100, a quantum system 101 includes an ancilla qubit 110 that is coupled to a logical qubit 120 via dispersive coupling. That is, the ancilla qubit to logical qubit detuning is much larger (e.g., an order of magnitude larger) than the coupling strength between the ancilla qubit 110 and the logical qubit 120. Logical qubit 120 is also coupled to logical qubits 140 by beamsplitters 130 (e.g., programmable beamsplitters). Energy source 150 may supply energy to one or both of ancilla qubit 110, logical qubit 120, beamsplitters 130, and/or logical qubits 140 in order to perform operations on the system such as preparing states in any one of the logical qubits 120 and/or 140, measuring one or more of the logical qubits 120 and/or 140, applying gate operations to one or more of the logical qubits 120 and/or 140, applying operations to or preparing states in the ancilla qubit 110, detecting and/or correcting errors in the ancilla qubit 110 and/or logical qubits 120 and/or 140, or combinations thereof.

According to some embodiments, logical qubit 120 and logical qubits 140 may be implemented as any suitable multimode bosonic system. While this may include photonic systems such as one or more microwave cavities, the techniques described herein are not limited to such systems. Logical qubit 120 and logical qubits 140 may be implemented as a multimode bosonic system, which may include any combination of multiple modes of a single bosonic system and/or single modes of multiple bosonic systems.

According to some embodiments, ancilla qubit 110 may include any suitable quantum system having three distinct states, such as but not limited to, those based on a superconducting Josephson junction such as a charge qubit (Cooper-pair box), a flux qubit or a phase qubit, a transmon qubit, or combinations thereof. The ancilla qubit 110 may be coupled to the logical qubit 120 via dispersive coupling which couples the state of the ancilla qubit 110 to the state of the logical qubit 120. The logical qubit 120 may include any bosonic system supporting a plurality of bosonic modes, which may be implemented using any electromagnetic, mechanical, magnetic (e.g., quantized spin waves also known as magnons), and/or other techniques, such as but not limited to any cavity resonator (e.g., a microwave cavity). According to some embodiments, logical qubit 120 may comprise a plurality of transmission line resonators.

According to some embodiments, beamsplitters 130 may be configured to provide switchable beamsplitter interactions between logical qubit 120 and one or more of logical qubits 140. For example, each beamsplitters 130 may actuate Hamiltonians of the form $$H = g(a_1^\dagger a_2 + a_1 a_2^\dagger)$$

between logical qubit 120 and one of logical qubits 140. The beamsplitters 130 may be implemented using, for example, a superconducting microwave circuit including but not limited to four-wave mixing with a parametrically-driven transmon and/or three-wave mixing with a superconducting nonlinear asymmetric inductive element-mon (a "SNAILmon") or a flux-pumped DC superconducting quantum interference device (a "SQUID").

System 100 also includes an energy source 150, a controller 160 and a storage medium 170 (e.g., a computer readable storage medium). In some embodiments, a library of precomputed drive waveforms 172 may be stored on the storage medium 170 and accessed by the controller 160 in order to apply said waveforms to the quantum system 101. For example, controller 160 may access drive waveforms 172 stored on storage medium 170 (e.g., in response to user input provided to the controller) and thereafter control the energy source 150 to apply one or more drive waveforms to the ancilla qubit 110, the logical qubit 120, the beamsplitters 130, and/or logical qubits 140, respectively.

As used herein, application of such an electromagnetic signal or pulse may also be referred to as "driving" of the ancilla qubit and/or the logical qubit. Coupling may utilize any technique(s) to couple the ancilla qubit and the logical qubit, such as by coupling electric and/or magnetic fields generated by the ancilla qubit and the logical qubit. According to some embodiments, the ancilla qubit (e.g., a transmon) may be coupled to the logical qubit, being a mechanical resonator, via a piezoelectric coupling. According to some embodiments, the ancilla qubit may be coupled to the logical qubit, being a magnetic resonator, by coupling the ancilla qubit (e.g., a transmon) to phonons, which in turn couple to magnons via magnetostrictive coupling.

Figure 2:
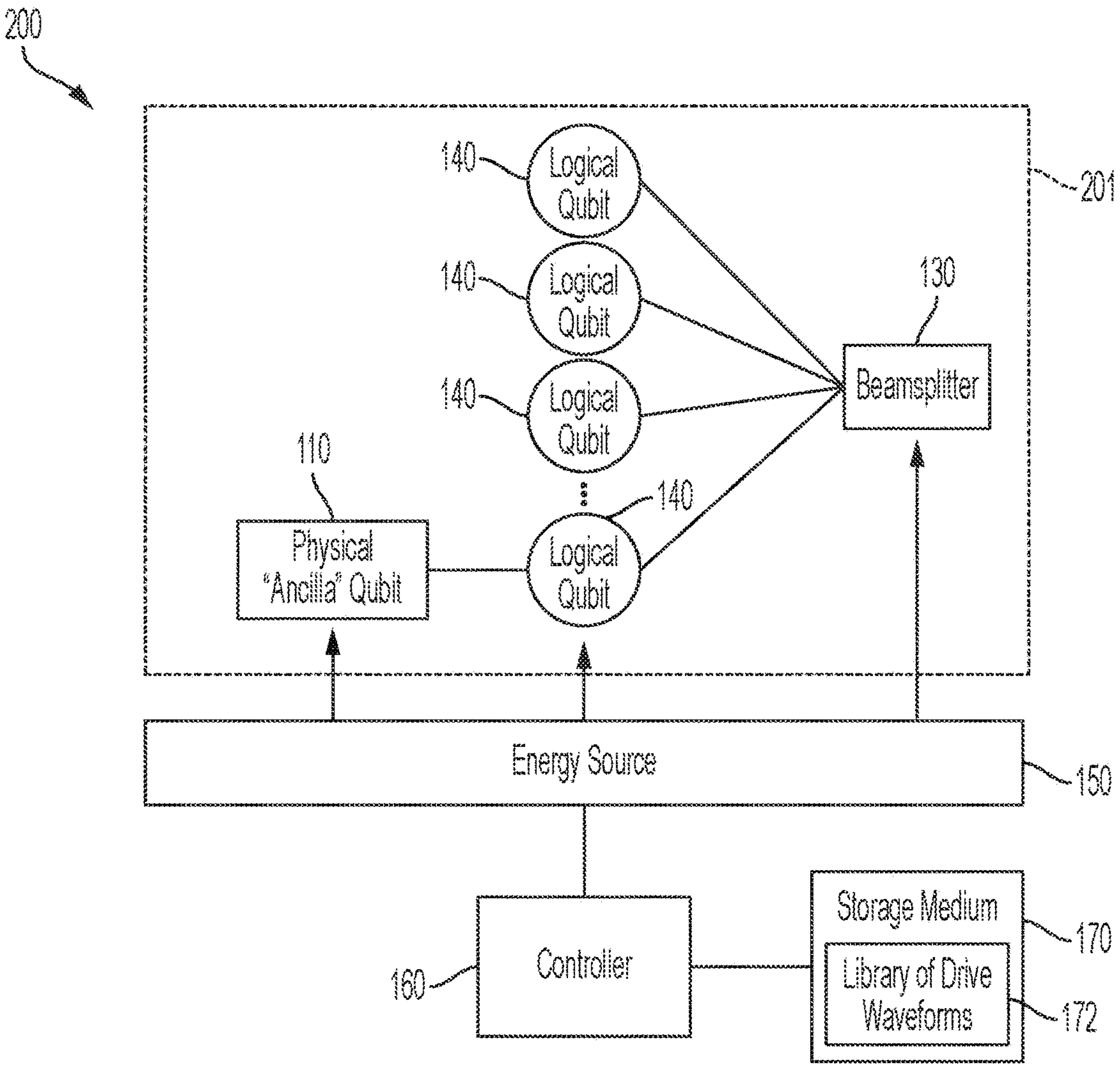
FIG. 2 is a schematic diagram of another illustrative quantum information processing system, in accordance with some embodiments of the technology described herein.

FIG. 2 depicts an alternative illustrative system suitable for practicing aspects of the present application. In system 200, the quantum system 201 includes an ancilla qubit 110 that is coupled to a logical qubit 140 via dispersive coupling. Logical qubit 140 is also coupled to other logical qubits 140 by a beamsplitter 130. This beamsplitter 130 is able to switch on and off beamsplitter interactions between any pair of logical qubits 140. Energy source 150 may supply energy to one or both of ancilla qubit 110, beamsplitter 130, and/or logical qubits 140 in order to perform operations on the system such as preparing states in any one of the logical qubits 140, measuring states of one or more of the logical qubits 140, applying gate operations to one or more of the logical qubits 140, applying operations to the ancilla qubit 110, detecting and correcting errors in the ancilla qubit 110 and/or the logical qubits 140, or combinations thereof.

II. Operations for the 4-Legged Cat Code

Bosonic quantum computing encodes quantum information in the degrees of freedom of harmonic oscillators. By doing so, quantum error correction may be implemented in a hardware efficient manner. That is, quantum errors that occur in the oscillator can be corrected without much additional physical hardware. One such encoding is the 4-legged cat code, which is designed to correct for single-photon loss errors in the oscillator, which is a dominant error channel in some quantum systems, such as quantum electrodynamic circuit systems.

To use this encoding as a quantum memory, the logical states are prepared in the appropriate codewords, single photon loss errors are detected and corrected for, and the logical information is subsequently read out from the quantum system. To further use this encoding for quantum computation, a universal gate set must be additionally implemented.

Neither quantum memory nor computing may be possible without quantum control of a harmonic oscillator. To implement quantum control of a harmonic oscillator with classical external drives, a source of non-linearity may be added to the system. For example, an ancilla qubit (e.g., a transmon qubit) may be added to the quantum system, the ancilla qubit being dispersively coupled to the harmonic oscillator (e.g., a microwave cavity resonator). Unfortunately, the ancilla qubit may be an additional source of error that may propagate to the information stored in the harmonic oscillators.

Because these errors generated by the ancilla qubit are quantum in nature, they may be described as jump operators. Whilst there are an infinite number of possible quantum errors, correcting for the most likely errors that can occur in this cavity-transmon system in the time window between error-correction steps significantly improves computation performance. Such errors include single photon loss in the harmonic oscillator, single decay of an excitation in the ancilla qubit, and/or dephasing of the state stored by the ancilla qubit. This set of errors can be compactly summarized as:

$$\{\mathbb{1}, \hat{a}, |g\rangle\langle e|, |e\rangle\langle e|\}$$

where $|g\rangle$ and $|e\rangle$ are the first two levels of the ancilla qubit and $\hat{a}$ is the annihilation operator for the harmonic oscillator. For a three-level ancilla qubit, a similar error set exists:

$$\{\mathbb{1}, \hat{a}, |e\rangle\langle f|, |f\rangle\langle f|\}$$

where $|f\rangle$ is the third level of the ancilla qubit.

The quantum operations described herein are fault tolerant to the above-described errors if the operations are designed such that, when one of these errors occurs, it does not cause a logical error on the qubit in the harmonic oscillator. This condition can be met either by being able to correct for the error at a later time or if the error has a negligible effect on the logical information stored in the harmonic oscillator.

The inventors have recognized and appreciated that attaining such a level of fault tolerance needed for universal quantum computation with the 4-legged cat code may be achieved in the measurement-based quantum computing (MBQC) paradigm. In circuit-model quantum computing, gates are applied to qubits that remain fixed throughout the computation. In contrast, MBQC proceeds by preparing qubits in an entangled resource state comprising a many-body entangled state, known as a "cluster state." The cluster state may then be used to perform computations by measuring the qubits in certain bases. Rather than implementing logical gates directly, the quantum operations may be partitioned into the preparation of quantum states and destructive measurements; these operations are then used to realize quantum gates and quantum error correction.

Figure 3A:
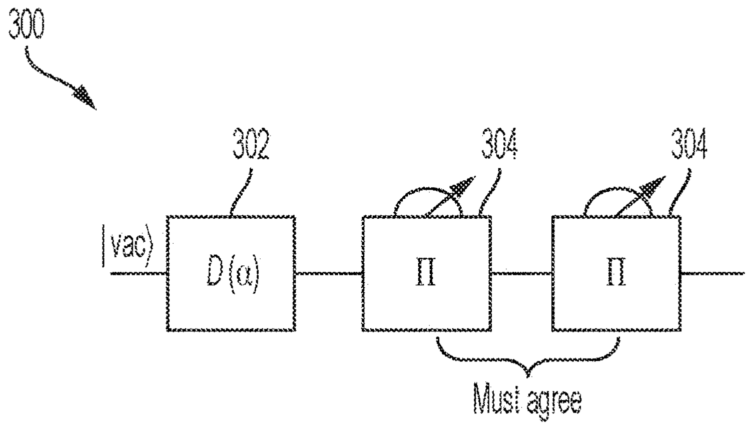
FIG. 3A is a schematic diagram of an illustrative quantum circuit for fault tolerant preparation of a $|+\rangle$ state in a qubit, in accordance with some embodiments of the technology described herein.

A first quantum operation to enable fault tolerant quantum computing in the 4-legged cat code is state preparation in the harmonic oscillators (e.g., logical qubits 120 or 140 as described in connection with FIG. 1 or 2 herein). FIG. 3A is a schematic diagram of an illustrative quantum circuit 300 for fault tolerant preparation of a $|+\rangle$ state in a qubit, in accordance with some embodiments of the technology described herein.

In some embodiments, the quantum circuit 300 describes operations applied to a single qubit in a sequential order, read from left to right. At leftmost, the qubit starts in the vacuum state ($|vac\rangle$). Thereafter, a displacement 302 ($D(\alpha)$) may be applied to displace the state of the qubit to a coherent state (e.g., $\alpha$=2 to 3). After displacing the state of the qubit, repeated parity measurements 304 may be performed. Fault tolerance to ancilla errors is achieved by requiring that the repeated parity measurements obtain the same measurement outcomes. If differing outcomes are obtained from each parity measurement 304, then it is inferred that an error occurred, and the state may be discarded. By requiring that the two measurement outcomes agree, the states $|\alpha\rangle \pm |-\alpha\rangle$ can be prepared with fault tolerance to the error set.

Figure 3B:
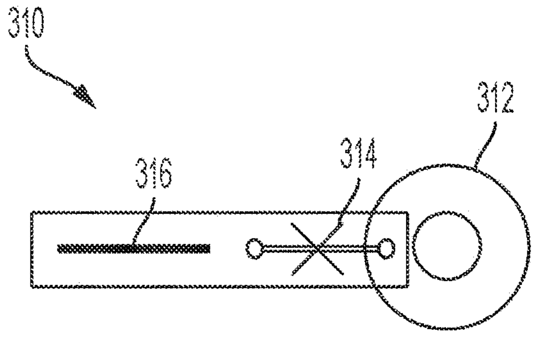
FIG. 3B is a schematic diagram of an illustrative quantum information processing system that can be used to implement the quantum circuit of FIG. 3A, in accordance with some embodiments of the technology described herein.

In some embodiments, the quantum circuit 300 may be implemented using the illustrative quantum information processing system 310 shown in FIG. 3B. Quantum information processing system 310 includes a logical qubit 312 depicted as a microwave cavity resonator. The logical qubit 312 is dispersively coupled to an ancilla transmon qubit 314. A readout resonator 316 (e.g., a microwave strip resonator) is coupled to the ancilla transmon qubit 314 and is configured to provide input to the ancilla transmon qubit 314 and/or to readout information from the ancilla transmon qubit 314.

Figure 3C:
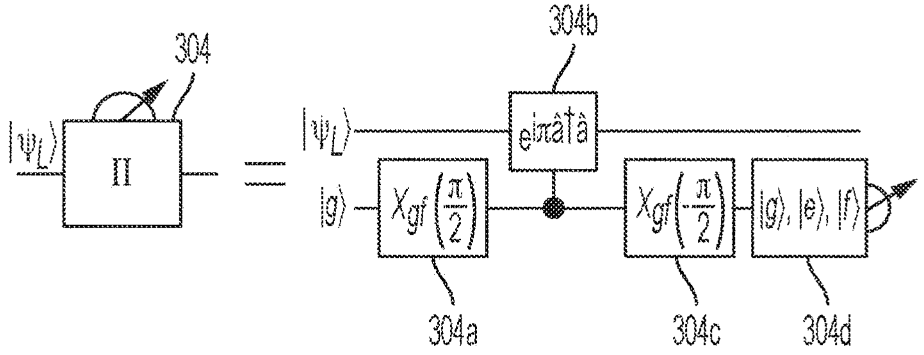
FIG. 3C is a schematic diagram of an illustrative quantum circuit for performing a parity measurement, in accordance with some embodiments of the technology described herein.

In some embodiments, the parity measurement 304 may be described as a sequence of quantum operations applied to the ancilla qubit and the logical qubit, as depicted in the example of FIG. 3C. In the quantum circuit of FIG. 3C, the ancilla qubit, $|g\rangle$, is depicted on the line below the logical qubit, $|\psi_L\rangle$. The quantum operations include a first $\pi/2$ rotation 304*a* of the ancilla qubit, a unitary operation 304*b* applied to the logical qubit, a second $-\pi/2$ rotation 304*c* of the ancilla qubit, and a measurement 304*d* of the state of the ancilla qubit.

Figure 3D:
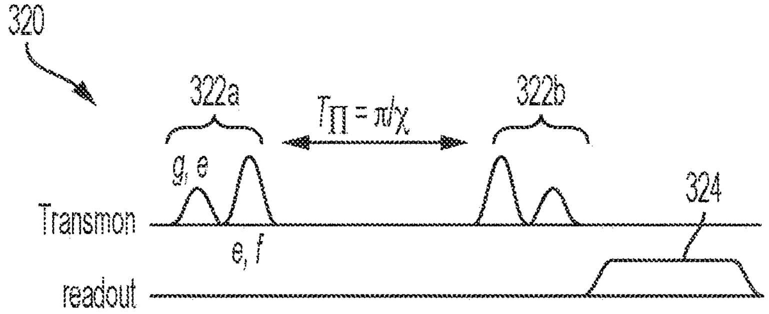
FIG. 3D is a schematic diagram of illustrative drive waveforms for performing the parity measurement of FIG. 3C, in accordance with some embodiments of the technology described herein.

These quantum operations may be physically implemented by applying a series 320 of drive waveforms to the ancilla qubit, as shown in the example of FIG. 3D. The series 320 includes a first sequence 322*a* including drive waveforms comprising g–e $\pi/2$ pulse and an e–f $\pi$ pulse and a subsequent second sequence 322*b* including drive waveforms comprising an e–f π pulse and a g–e π/2 pulse. The sequences 322*a* and 322*b* are separated by a time delay, $T_{\Pi}=\pi/\chi$. After sequence 322*b* is complete, a readout 324 of the state of the ancilla qubit is performed.

Figure 4A:
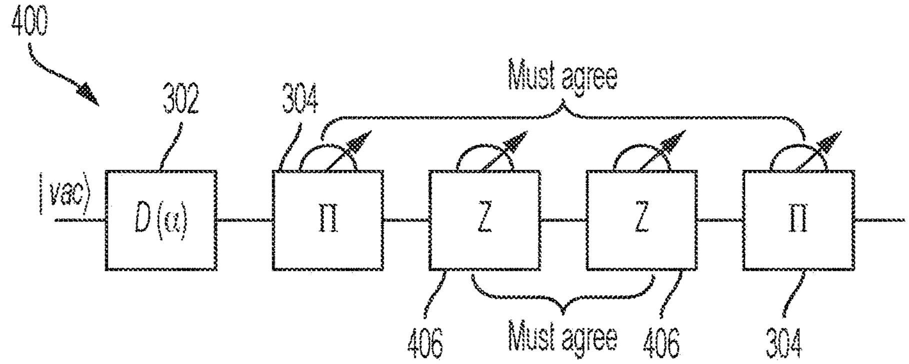
FIG. 4A is a schematic diagram of an illustrative quantum circuit for fault tolerant preparation of a $|0\rangle$ or a $|1\rangle$ state in a qubit, in accordance with some embodiments of the technology described herein.

Another quantum operation to perform state preparation in the 4-legged cat code is depicted in FIG. 4A. In the example of FIG. 4A, the quantum circuit 400 is configured to prepare the 4-legged cat states $|\alpha\rangle \pm |i\alpha\rangle + |\alpha\rangle \pm |-i\alpha\rangle$ which serve as the logical 0 and 1 codewords for the 4-legged cat code, in accordance with some embodiments. The quantum circuit 400 starts with the logical qubit in the vacuum state ($|vac\rangle$). Thereafter, a displacement 302 ($D(\alpha)$) may be applied, as described in connection with FIG. 3A. To fault tolerantly prepare the 4-legged cat states, a series of parity measurements 304 and logical Z measurements 406 may be applied in the order depicted in FIG. 4A.

In some embodiments, the logical Z measurements 406 may be implemented by measuring the 4-parity of the logical qubit. This measurement determines whether the logical qubit contains 0, 4, 8, etc. photons or 2, 6, 10, etc. photons. If the qubit contains 0, 4, 8, etc. photons, then the measurement generates a +1 outcome, but if the qubit contains 2, 6, 10, etc. photons, then the measurement generates a −1 outcome. If the qubit contains an odd number of photons, then the measurement generates a random outcome. Fault tolerance is again achieved by requiring pairs of the parity measurements 304 and pairs of logical Z measurements 406 to agree for a successful state preparation attempt.

Figure 4B:
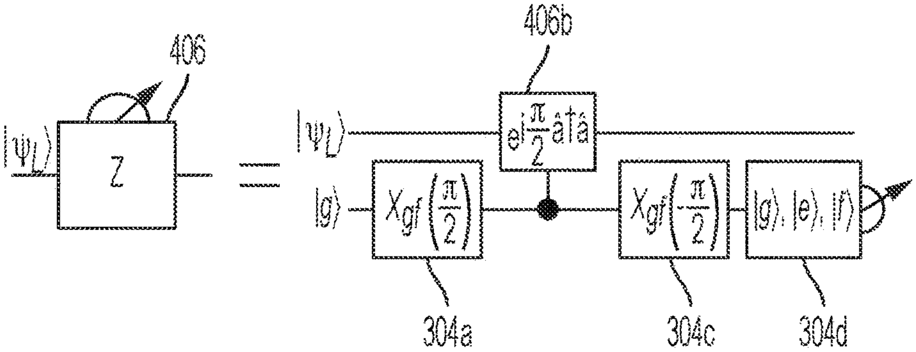
FIG. 4B is a schematic diagram of an illustrative quantum circuit for performing a Z measurement, in accordance with some embodiments of the technology described herein.
Figure 4C:
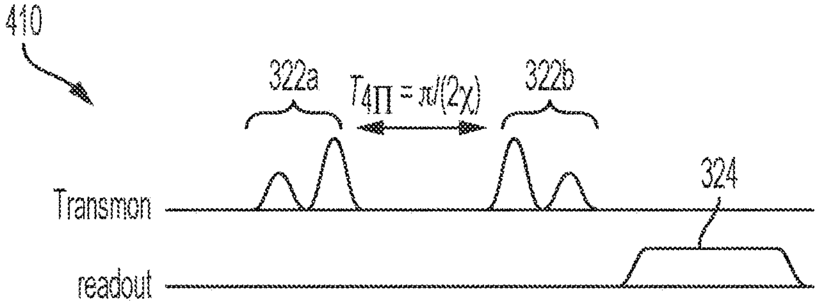
FIG. 4C is a schematic diagram of illustrative drive waveforms for performing the Z measurement of FIG. 4B, in accordance with some embodiments of the technology described herein.

In some embodiments, the logical Z measurement 406 may be described as a sequence of quantum operations applied to the ancilla qubit and the logical qubit, as depicted in the example of FIG. 4B. The logical Z measurement 406 differs from the parity measurement 304 only in that the unitary operation 406*b* is performed for half the wait time ($T_{4\Pi}=\pi/2\chi=T_{\Pi}/2$) as the unitary operation 304*b* as described in connection with FIG. 3B. Similarly, the series of drive waveforms 410, as depicted in FIG. 4C, are identical to those of the series of drive waveforms 320, with the only change being that the wait time between the first sequence 322*a* and the second sequence 322*b* is $T_{4\Pi}=\pi/2\chi$.

Figure 5:
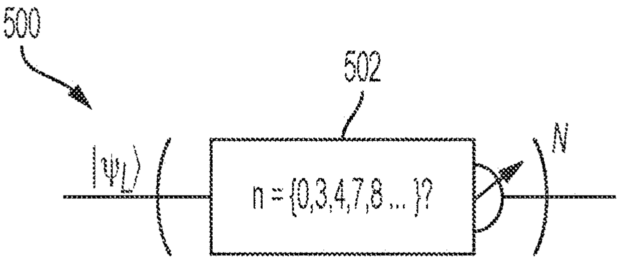
FIG. 5 is a schematic diagram of an illustrative quantum circuit for performing a fault tolerant measurement in the Z basis, in accordance with some embodiments of the technology described herein.

In addition to preparing states in the logical qubits, the state of the logical qubit must be measured as a part of a quantum computing implementation. FIG. 5 is a schematic diagram of an illustrative quantum circuit 500 for performing a fault tolerant measurement in the Z basis of the 4-legged cat code, in accordance with some embodiments of the technology described herein. The quantum circuit 500 includes a measurement 502 of the logical qubit, $|\psi_L\rangle$. This measurement 502 may be destructive in the sense that it dephases the state stored in the logical qubit when decay errors occur during the measurement 502. In such instances, while the state stored in the logical qubit cannot thereafter be used for further logical operations, it may be continued to be measured to improve the overall measurement fidelity through majority voting of the repeated measurement outcomes.

In some embodiments, the measurement 502 in the Z basis of the 4-legged cat code may be physically implemented by applying Optimal Control Pulses to the ancilla qubit to excite the ancilla qubit if and only if the logical qubit contains n=0, 3, 4, 7, 8, . . . photons. Alternatively, the ancilla qubit may be driven by a linear combination of selective It pulses at appropriate frequencies to implement the measurement 502.

Figure 6:
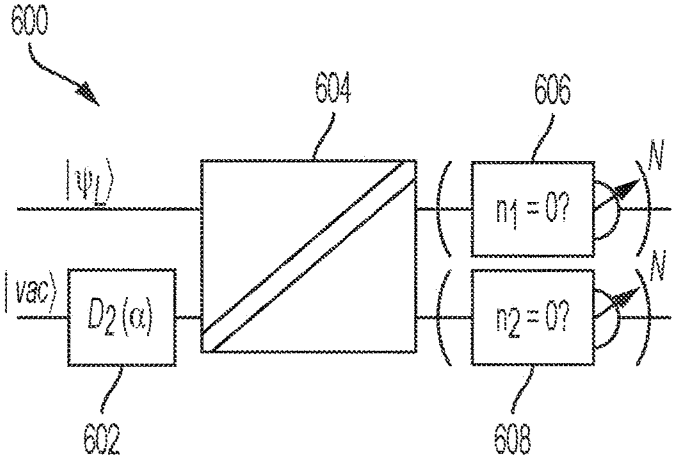
FIG. 6 is a schematic diagram of an illustrative quantum circuit for performing a fault tolerant measurement in the X basis, in accordance with some embodiments of the technology described herein.

FIG. 6 is a schematic diagram of an illustrative quantum circuit 600 for performing a fault tolerant measurement in the X basis of the 4-legged cat code, in accordance with some embodiments. To perform a fault tolerant measurement in the X basis, the quantum circuit 600 includes the use of an ancillary logical qubit, shown on the lower line of the circuit diagram. The ancillary logical qubit may begin in the vacuum state ($|vac\rangle$) and thereafter be prepared in a coherent state by a displacement 602 ($D(\alpha)$) (e.g., as described in connection with the displacement 302 of FIG. 3C). The measurement in the X basis distinguishes between the $|\alpha\rangle \pm |-\alpha\rangle$ state and the $|i\alpha\rangle \pm |-i\alpha\rangle$ state through beamsplitter interference 604 between the coherent state and the state of the logical qubit, $|\psi_L\rangle$. The measurements 606 and 608 (e.g., implemented using selective π pulses) determine whether only one of the logical qubit and the ancillary qubit contain 0 photons. If exactly one of the logical qubit and the ancillary qubit contains 0 photons, then it is known that the input state was $|\alpha\rangle \pm |-\alpha\rangle$ because there is only a probability of $e^{-|\alpha|^2}$ when the input state is $|i\alpha\rangle \pm |-i\alpha\rangle$. This is the intrinsic error probability which can be very small if α is large enough. As with the measurement 502 in the Z basis, the measurement 600 in the X basis may be made fault tolerant by repeating the measurement and using majority voting.

Figure 7:
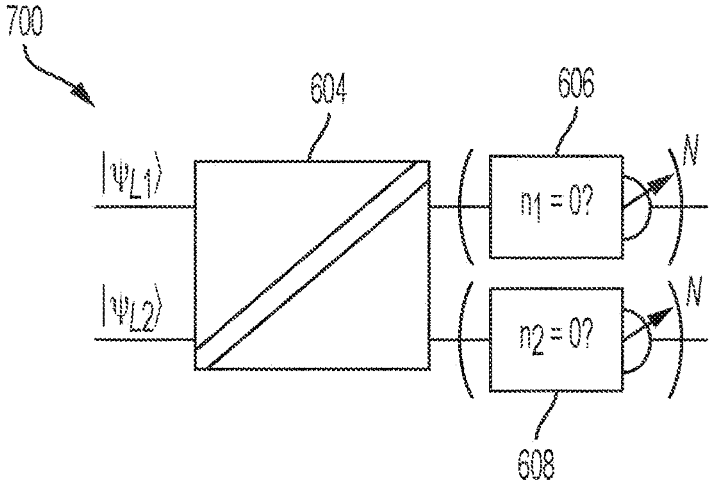
FIG. 7 is a schematic diagram of an illustrative quantum circuit for performing a fault tolerant measurement in the XX basis, in accordance with some embodiments of the technology described herein.

FIG. 7 is a schematic diagram of an illustrative quantum circuit 700 for performing a fault tolerant measurement in the XX basis of the 4-legged cat code, in accordance with some embodiments. The fault tolerant measurement in the XX basis is very similar to the measurement 600 described in connection with FIG. 6. Instead of using a logical qubit and an ancillary qubit, the measurement of quantum circuit 700 begins with two logical qubits, $|\psi_{L1}\rangle$ and $|\psi_{L2}\rangle$. If one of the logical qubits is measured as containing 0 photons by measurements 606 and 608, this indicates that the two-legged cats are both aligned along the same direction in phase space.

Figure 8A:
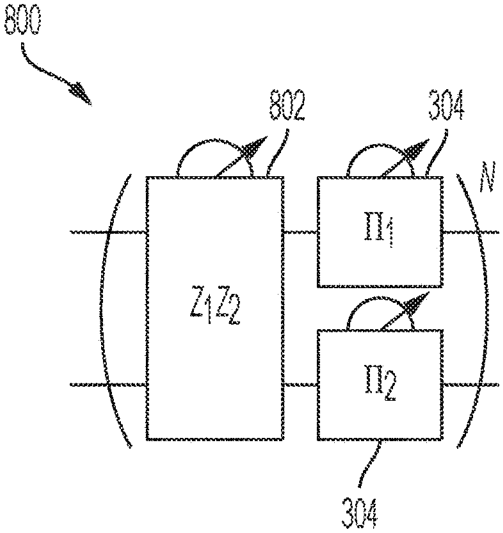
FIG. 8A is a schematic diagram of an illustrative quantum circuit for performing a fault tolerant measurement in the ZZ basis, in accordance with some embodiments of the technology described herein.

FIG. 8A is a schematic diagram of an illustrative quantum circuit 800 for performing a fault tolerant measurement in the ZZ basis of the 4-legged cat code, in accordance with some embodiments. The quantum circuit 800 includes, in some embodiments, a measurement 802 of the joint 4-parity of the two logical qubits.

One way to measure the joint 4-parity of two logical qubits is to have an ancilla qubit coupled to a single cavity mode stored in a logical qubit. Then, a single mode 4-parity measurement sequence may be performed without measuring any states. A SWAP operation may then be applied, as described in connection with FIG. 19 herein, followed by another single mode 4-parity measurement. Thereafter, the ancilla qubit may be measured in the X basis and another SWAP operation performed. However, this process faces the limitation that the beamplitter rate is typically smaller than χ such that χ would need to be canceled during the SWAP operations.

A faster sequence that avoids this problem is to combine the SWAP operations and the dispersive Hamiltonian into a single operation that implements a joint 4-parity measurement. To see how this works, first note that the joint 4-parity operator is a joint rotation of the cavity phase spaces by 90 degrees:

$$\Pi_4 = e^{i\frac{\pi}{2}\left(a_1^\dagger a_1 + a_2^\dagger a_2\right)}.$$

To measure this operator, a controlled joint cavity rotation may be applied in between two π/2 pulses, thereafter reading out the ancilla qubit. A symmetrized version of this gate can be written as:

$$U_t = e^{-i\frac{\pi}{4}\left(a_1^\dagger a_1 + a_2^\dagger a_2\right)} \otimes |g\rangle\langle g| + e^{i\frac{\pi}{4}\left(a_1^\dagger a_1 + a_2^\dagger a_2\right)} \otimes |e\rangle\langle e|$$

or equivalently:

$$U_t = e^{-i\frac{3\pi}{4}\left(a_1^\dagger a_1 + a_2^\dagger a_2\right)} \otimes |g\rangle\langle g| + e^{i\frac{3\pi}{4}\left(a_1^\dagger a_1 + a_2^\dagger a_2\right)} \otimes |e\rangle\langle e|$$

Note that there is an unconditional joint cavity phase rotation of π/4 or 3π/4 every time this measurement is performed, which may be tracked in software. With the correct timing and ratio of χ to g, it is possible to generate either unitary from the Hamiltonian:

$$H_t = g a_1^\dagger a_2 + h.c. + \frac{\pi}{2}\sigma_z a_1^\dagger a_1.$$

For a given value of χ, two of the first operating points are to set $$g = \sqrt{\frac{15}{16}}\chi \text{ or } g = \sqrt{\frac{7}{144}}\chi.$$

Then, the above Hamiltonian may be applied for time $$t = \frac{\pi}{\sqrt{g^2 + \chi^2}}.$$

These particular ratios may implement the desired unitaries. This measurement can be made fault tolerant to transmon errors in the same way as the fault tolerant parity measurement described in connection with FIGS. 3A-3D. Using the g–f manifold of the ancilla qubit allows for the detection of transmon decay errors when |e⟩ is measured with $\chi^-$ matching. This measurement also does not dephase the cavity even in the presence of a single transmon decay. Photon loss may be correctable provided that parity measurements are used to track the parity and the 4-parity measurement is updated accordingly before the next parity jump occurs. For example, the ancilla qubit may be readout in the y basis if the cavity is odd by adding a 90° phase offset to the final π/2 pulses.

Returning to FIG. 8A, the measurement 802 of the joint 4-parity determines whether the total number of photons present in the two logical qubits is n=0, 4, 8, . . . or n=2, 6, 10, . . . , for example. The measurement 802 is then followed by parity measurements 304 performed on each of the logical qubits, as described in connection with FIGS. 3A-3D. These parity measurements 304 are used to determine whether any photon loss has occurred in either of the logical qubits.

Figure 8B:
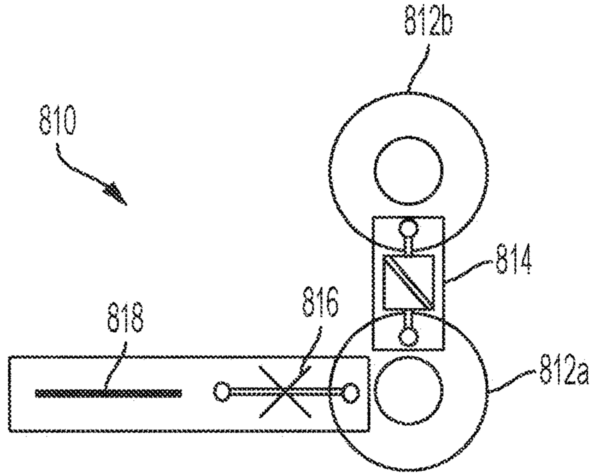
FIG. 8B is a schematic diagram of an illustrative quantum information processing system that can be used to implement the quantum circuit of FIG. 8A, in accordance with some embodiments of the technology described herein.

In some embodiments, the quantum circuit 800 may be implemented using the illustrative quantum information processing system 810 shown in FIG. 8B. Quantum information processing system 810 includes a first logical qubit 812*a* and a second logical qubit 812*b*. Both may be microwave cavity resonators, as depicted in the example of FIG. 8B. The first and second logical qubits 812*a*, 812*b* are coupled to one another by a beamsplitter 814. The first logical qubit 812*a* is dispersively coupled to an ancilla transmon qubit 816. A readout resonator 818 (e.g., a microwave strip resonator) is coupled to the ancilla transmon qubit 816 and is configured to provide input to the ancilla transmon qubit 906 and/or to readout information from the ancilla transmon qubit 816.

Figure 8C:
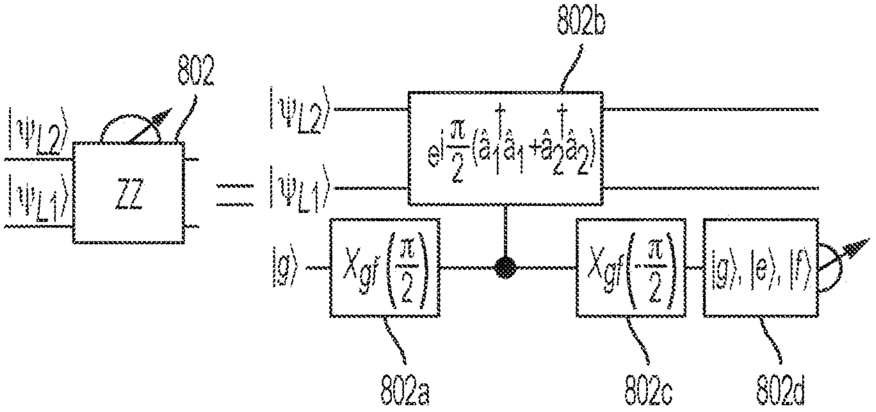
FIG. 8C is a schematic diagram of an illustrative quantum circuit for performing a ZZ measurement, in accordance with some embodiments of the technology described herein.

In some embodiments, the measurement 802 of the joint 4-parity of the two logical qubits may be described as a sequence of quantum operations applied to the ancilla qubit and the two logical qubits, as depicted in the example of FIG. 8C. In the quantum circuit of FIG. 8C, operations on the ancilla qubit, |g⟩, are depicted on the line below the logical qubits, $|\psi_{L1}\rangle$ and $|\psi_{L2}\rangle$. The logical qubit storing the state $|\psi_{L1}\rangle$ is the logical qubit that is dispersively coupled to the ancilla qubit, while the logical qubits, $|\psi_{L1}\rangle$ and $|\psi_{L2}\rangle$, are coupled by a beamsplitter, as described in connection with the example of FIG. 8B. The quantum operations include a first π/2 rotation 802*a* of the ancilla qubit, a beamsplitter operation 802*b* applied to the logical qubits $|\psi_{L1}\rangle$ and $|\psi_{L2}\rangle$, a second −π/2 rotation 802*c* of the ancilla qubit, and a measurement 802*d* of the state of the ancilla qubit.

Figure 8D:
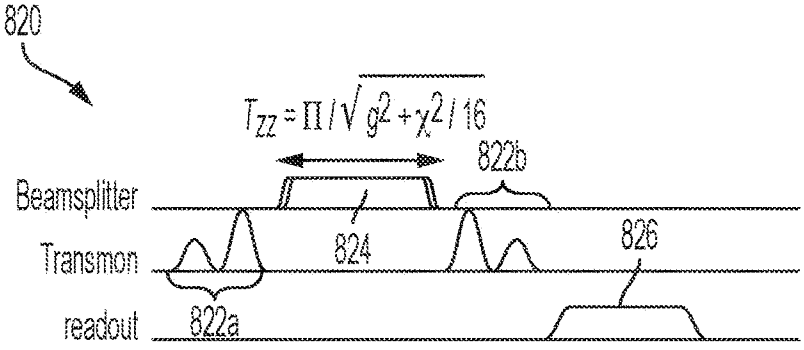
FIG. 8D is a schematic diagram of illustrative drive waveforms for performing the ZZ measurement of FIG. 8B, in accordance with some embodiments of the technology described herein.

The quantum operations of FIG. 8C may be physically implemented by applying a series 820 of drive waveforms to the ancilla qubit, as shown in the example of FIG. 8D. The series 820 includes a first sequence 822*a* including drive waveforms comprising g–e π/2 pulse and an e–f π pulse and a subsequent second sequence 822*b* including drive waveforms comprising an e–f π pulse and a g–e π/2 pulse. The sequences 822*a* and 822*b* are separated by a time delay, $T_{ZZ}=\pi/\sqrt{g^2+\chi^2/16}$. During this time delay, $T_{ZZ}$, a drive waveform is applied to the beamsplitter coupling the two logical qubits to enact a detuned beamsplitter interaction having a Hamiltonian of the form:

$$H = g_{BS}\left(a_1 a_2^\dagger + a_1^\dagger a_2\right) + \Delta_{BS} a_1^\dagger a_1$$

for the time $T_{ZZ}$, where $\Delta_{BS}=\chi\sqrt{7}/12$ and $g_{BS}=+\chi/2$. In addition to measuring the joint 4-parity operator, this sequence also adds a deterministic rotation of −45° on the state stored in each logical qubit, which may be tracked in software. After sequence 822*b* is complete, a readout 826 of the state of the ancilla qubit is performed.

Figure 9A:
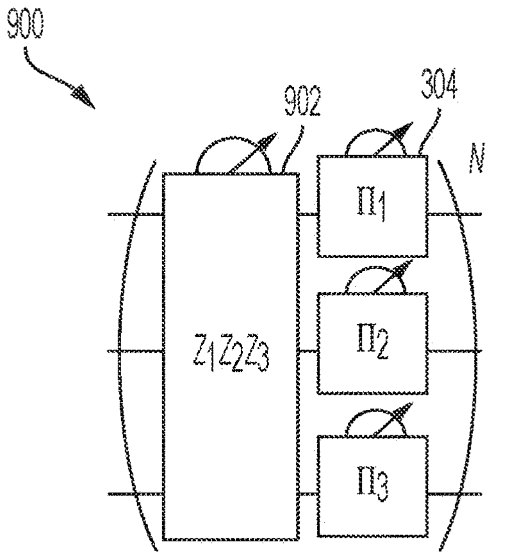
FIG. 9A is a schematic diagram of an illustrative quantum circuit for performing a fault tolerant measurement in the ZZZ basis, in accordance with some embodiments of the technology described herein.

FIG. 9A is a schematic diagram of an illustrative quantum circuit 900 for performing a fault tolerant measurement in the ZZZ basis of the 4-legged cat code, in accordance with some embodiments. The quantum circuit 900 may be considered an extension of the quantum circuit 800 and includes a 3-qubit measurement rather than a 2-qubit measurement. To implement the ZZ measurement of quantum circuit 800, a switchable beamsplitter interaction between $a_1$ and $a_2$ and a three-level ancilla qubit dispersively coupled to $\alpha_1$ were used. To extend this to a ZZZ measurement of quantum circuit 900, an additional switchable beamsplitter coupling may be added between logical qubits $a_1$ and $a_3$, where $a_3$ is the field operator of a third logical qubit. The target unitary between the π/2 pulses is:

$$U_{ZZZ} = e^{-i\frac{\pi}{4}\left(a_1^\dagger a_1 + a_2^\dagger a_2 + a_3^\dagger a_3\right)} \otimes |g\rangle\langle g| + e^{i\frac{\pi}{4}\left(a_1^\dagger a_1 + a_2^\dagger a_2 + a_3^\dagger a_3\right)} \otimes |e\rangle\langle e|.$$

Two pairwise beamsplitter interactions implemented sequentially between a first logical qubit and a second logical qubit and then between the first logical qubit and a third logical qubit followed by a suitable wait time can be used to enact the above unitary.

Performing the two sequential pairwaise beamsplitter interactions yields the following unitary:

$$U_{T_1}^{1,2}U_{T_1}^{1,3}=\left(e^{-i\frac{\pi}{4}\left(a_1^\dagger a_1+a_2^\dagger a_2\right)}\otimes|g\rangle\langle g|+e^{i\frac{\pi}{4}\left(a_1^\dagger a_1+a_2^\dagger a_2\right)}\otimes|e\rangle\langle e|\right)\left(e^{-i\frac{\pi}{4}\left(a_1^\dagger a_1+a_3^\dagger a_3\right)}\otimes|g\rangle\langle g|+e^{i\frac{\pi}{4}\left(a_1^\dagger a_1+a_3^\dagger a_3\right)}\otimes|e\rangle\langle e|\right)=e^{-i\frac{\pi}{4}\left(2a_1^\dagger a_1+a_2^\dagger a_2+a_3^\dagger a_3\right)}\otimes|g\rangle\langle g|+e^{i\frac{\pi}{4}\left(2a_1^\dagger a_1+a_2^\dagger a_2+a_3^\dagger a_3\right)}\otimes|e\rangle\langle e|.$$

From this equation, it can be observed that the first logical qubit has accumulated additional conditional phase. If measured after performing these two beamsplitter interactions, the operator $\Pi_1Z_2Z_3$, where $\Pi$ is the photon number parity of the first logical qubit. To counteract this, waiting a time $T=\pi/(2\chi)$ results in the following unitary:

$$U_{wait}U_{T_1}^{1,2}U_{T_1}^{1,3}=\left(|g\rangle\langle g|+|e\rangle\langle e|e^{-i\frac{\pi}{2}a_1^\dagger a_1}\right)\left(e^{-i\frac{\pi}{4}\left(2a_1^\dagger a_1+a_2^\dagger a_2+a_3^\dagger a_3\right)}\otimes|g\rangle\langle g|+e^{i\frac{\pi}{4}\left(2a_1^\dagger a_1+a_2^\dagger a_2+a_3^\dagger a_3\right)}\otimes|e\rangle\langle e|\right)$$

which can be rearranged to give:

$$U'_{ZZZ}=U_{wait}U_{T_1}^{1,2}U_{T_1}^{1,3}=e^{-i\frac{\pi}{4}\left(a_1^\dagger a_1+a_2^\dagger a_2+a_3^\dagger a_3\right)}\otimes|g\rangle\langle g|+e^{i\frac{\pi}{4}\left(a_1^\dagger a_1+a_2^\dagger a_2+a_3^\dagger a_3\right)}\otimes|e\rangle\langle e|.$$

Figure 9B:
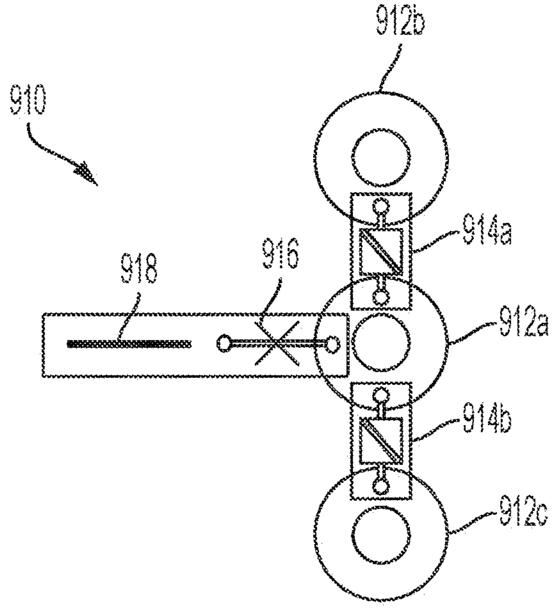
FIG. 9B is a schematic diagram of an illustrative quantum information processing system that can be used to implement the quantum circuit of FIG. 9A, in accordance with some embodiments of the technology described herein.

Returning to FIG. 9A, in some embodiments, the quantum circuit 900 may be implemented using the illustrative quantum information processing system 910 shown in FIG. 9B. Quantum information processing system 910 includes a first logical qubit 912*a*, a second logical qubit 912*b*, and a third logical qubit 912*c*. All three qubits 912*a*, 912*b*, and/or 912*c* may be microwave cavity resonators, as depicted in the example of FIG. 9B. The first and second logical qubits 912*a*, 912*b* are coupled to one another by a beamsplitter 914*a*. The first and third logical qubits 912*a*, 912*c* are coupled to one another be another beamsplitter 914*b*. The first logical qubit 912*a* is dispersively coupled to an ancilla transmon qubit 916. A readout resonator 918 (e.g., a microwave strip resonator) is coupled to the ancilla transmon qubit 916 and is configured to provide input to the ancilla transmon qubit 916 and/or to readout information from the ancilla transmon qubit 916.

Figure 9C:
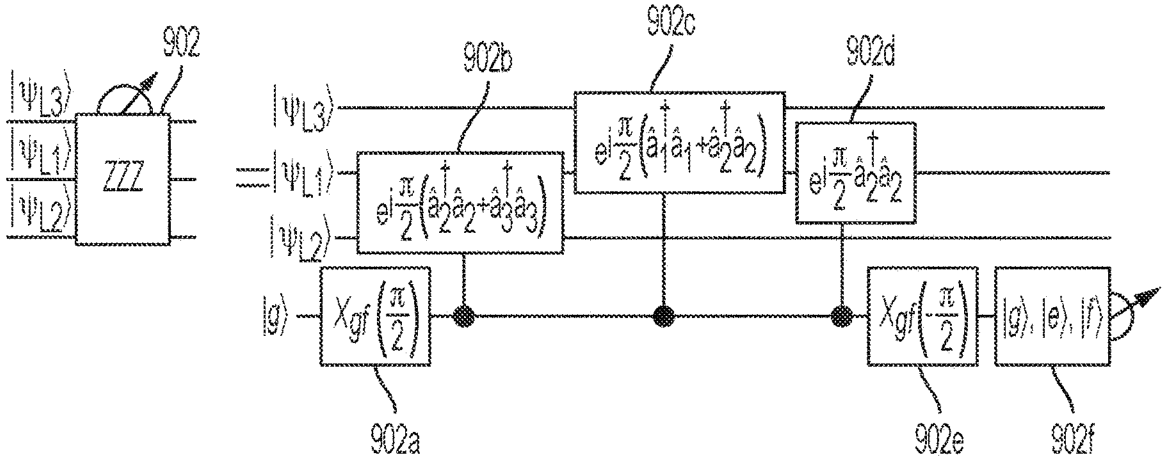
FIG. 9C is a schematic diagram of an illustrative quantum circuit for performing a ZZZ measurement, in accordance with some embodiments of the technology described herein.

In some embodiments, the measurement 902 of the three logical qubits may be described as a sequence of quantum operations applied to the ancilla qubit and the three logical qubits, as depicted in the example of FIG. 9C. In the quantum circuit of FIG. 9C, operations on the ancilla qubit, $|g\rangle$, are depicted on the line below the logical qubits, $|\psi_{L1}\rangle$, $|\psi_{L2}\rangle$, and $|\psi_{L3}\rangle$. The logical qubit storing the state $|\psi_{L1}\rangle$ is the logical qubit that is dispersively coupled to the ancilla qubit, while the pairs of logical qubits, $|\psi_{L1}\rangle$ and $|\psi_{L2}\rangle$ and $|\psi_{L1}\rangle$ and $|\psi_{L3}\rangle$, are each coupled by a beamsplitter, as described in connection with the example of FIG. 9B. The quantum operations include: a first $\pi/2$ rotation

902*a* of the ancilla qubit; a beamsplitter operation 902*b* applied to the logical qubits $|\psi_{L1}\rangle$ and $|\psi_{L2}\rangle$; a second beamsplitter operation 902*c* applied to the logical qubits $|\psi_{L1}\rangle$ and $|\psi_{L3}\rangle$; a unitary operation 902*d* applied to the first logical qubit $|\psi_{L1}\rangle$; a second $-\pi/2$ rotation 902*e* of the ancilla qubit, and a measurement 902*f* of the state of the ancilla qubit.

Figure 9D:
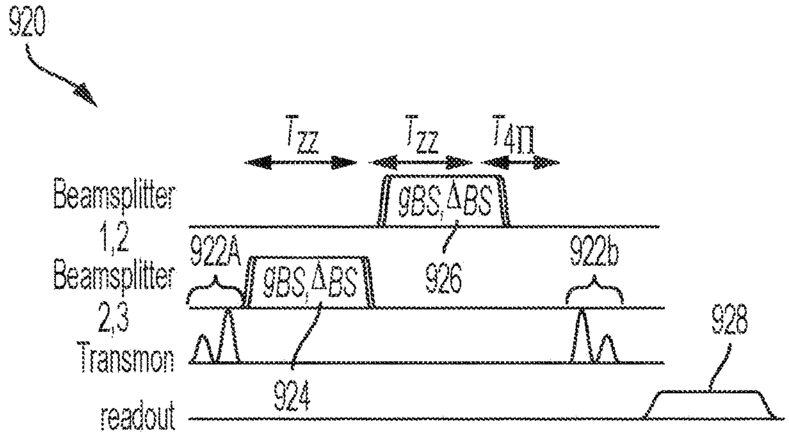
FIG. 9D is a schematic diagram of illustrative drive waveforms for performing the ZZZ measurement of FIG. 9C, in accordance with some embodiments of the technology described herein.

The quantum operations of FIG. 9C may be physically implemented by applying a series 920 of drive waveforms to the ancilla qubit and the beamsplitters, as shown in the example of FIG. 9D. The series 920 includes a first sequence 922*a* including drive waveforms comprising g–e $\pi/2$ pulse and an e–f $\pi$ pulse and a subsequent second sequence 922*b* including drive waveforms comprising an e–f $\pi$ pulse and a g–e $\pi/2$ pulse. The sequences 922*a* and 922*b* are separated by a time delay, $2T_{ZZ}+T_{4\Pi}$. During this time delay, $2T_{ZZ}+T_{4\Pi}$, drive waveform is applied to the two beamsplitter coupling the pairs of logical qubits to enact a detuned beamsplitter interaction having a Hamiltonian of the form described above. The period of time with length $T_{4\Pi}$ may be used to correct any rotations of the states stored in the logical qubits which have accumulated (e.g., −90°, −45°, and −45° for the first, second, and third logical qubits, respectively).

The ZZZ measurement of FIGS. 9A-9C completes the Clifford gate set for the 4-legged cat code because it can be used to implement a CNOT gate when combined with the other quantum operations described above. One can show that this is possible by using ZZZ measurements on the separable state $|{+}{+}{+}\rangle$ to create the entangled state $|{+}{+}{+}\rangle+|{-}{-}{-}\rangle$. Measuring pairs of ZZ operators (e.g. $Z_1Z_2$ and $Z_2Z_3$) on the same initial state $|{+}{+}{+}\rangle$ can create a similar entangled state, $|000\rangle+|111\rangle$. Bell basis measurements on these states can deterministically implement a CNOT gate up to local Pauli corrections, forming a gate set that is known to be universal.

Figure 10:
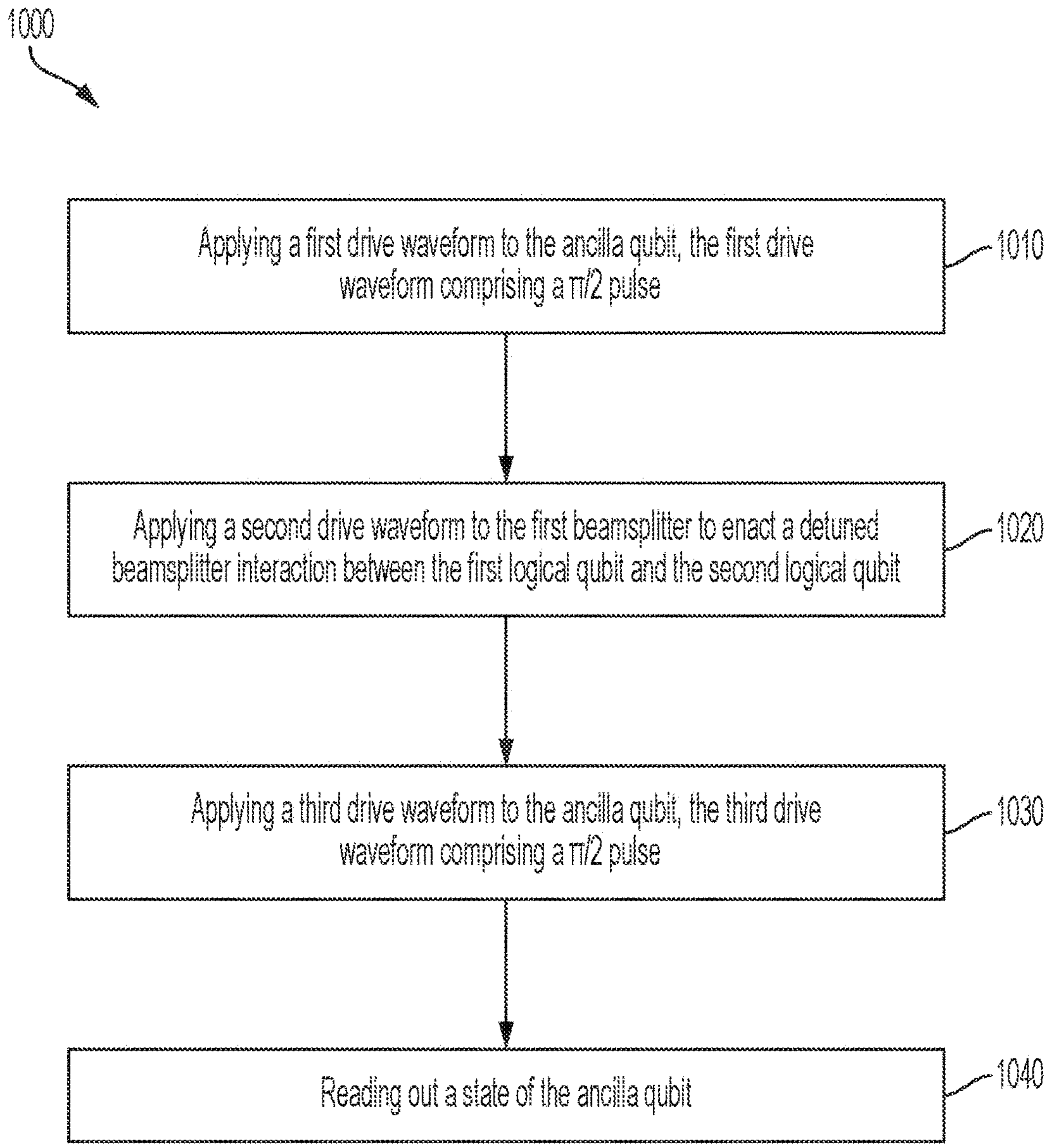
FIG. 10 is a flowchart describing a process 1000 for performing a quantum operation, in accordance with some embodiments of the technology described herein.

FIG. 10 is a flowchart describing a process 1000 for performing a quantum operation, in accordance with some embodiments described herein. The process 1000 may be used to operate, for example, a quantum information processing system comprising circuit quantum electrodynamics components. The quantum information processing system may include an ancilla qubit (e.g., a transmon qubit, a SNAILmon qubit, an oscillator, or another qubit) coupled to a first logical qubit (e.g., a microwave cavity resonator). The first logical qubit may be coupled to a second logical qubit by a first beamsplitter.

In some embodiments, the process 1000 includes applying one or more drive waveforms to the ancilla qubit and/or the first beamsplitter. The drive waveforms may be stored on one or more computer readable storage media (e.g., locally or remotely) and may be accessed by a controller. To apply the drive waveforms, the controller may cause an energy source (e.g., a microwave source) to generate the drive waveforms and to transmit the drive waveforms to the ancilla qubit and/or the first beamsplitter.

In some embodiments, the process 1000 may begin at act 1010, wherein a first drive waveform may be applied to the ancilla qubit. The first drive waveform may comprise a π\2 pulse. In some embodiments, the first drive waveform may include a sequence of drive waveforms. For example, the series of drive waveforms may include a g–e $\pi/2$ pulse and an e–f $\pi$ pulse.

In some embodiments, after act 1010, the process 1000 may proceed to act 1020. In act 1020, a second drive waveform may be applied to the first beamsplitter to enact a detuned beamsplitter interaction between the first logical qubit and the second logical qubit. The detuned beamsplitter interaction may be enacted for a time delay of $T_{ZZ}=\pi/\sqrt{g^2+\chi^2/16}$. During this time delay, $T_{ZZ}$, a drive waveform may be applied to the beamsplitter coupling the two logical qubits to enact a detuned beamsplitter interaction having a Hamiltonian of the form.

$$H = g_{BS}(a_1 a_2^\dagger + a_1^\dagger a_2) + \Delta_{BS} a_1^\dagger a_1$$

for the time $T_{ZZ}$, where $\Delta_{BS}=\sqrt{7}/12$ and $g_{BS}=+\chi/2$.

In some embodiments, after act 1020, the process 1000 may proceed to act 1030 wherein a third drive waveform may be applied to the ancilla qubit. The third drive waveform may comprise a $\pi\backslash 2$ pulse. In some embodiments, the first drive waveform may include a sequence of drive waveforms. For example, the sequence of drive waveforms may include an e–f $\pi$ pulse and a g–e $\pi/2$ pulse.

In some embodiments, after act 1030, the process 1000 may proceed to act 1040 wherein a state of the ancilla qubit may be read out. In some embodiments, the state of the ancilla qubit may be read out using a read-out cavity or microwave strip resonator coupled to the ancilla qubit. To readout the state of the ancilla qubit, a measurement of the state of the ancilla qubit may be made. For example, a destructive measurement of the state of the ancilla qubit may be made. In some embodiments, this measurement may be made, for example, using a microwave radiation detector capable of distinguishing between the possible states of the read-out cavity or microwave strip resonator. For example, the microwave radiation detector may be a homodyne detector or a heterodyne detector, in some embodiments.

III. Telecorrection

In standard quantum teleportation, an unknown state is "teleported" to a new physical system. This teleportation may be implemented using two steps. First, an entangled Bell pair may be created. Second, a measurement of an unknown state and one half of the Bell pair in the Bell basis is performed. Up to known Pauli corrections, which depend on the measurement outcomes, the unknown state is deterministically teleported to the other half of the Bell pair after this measurement.

One problem which has long been an outstanding difficulty with the 4-legged cat code is the so-called "no-jump" back-action which causes the "size" of the cats, $\alpha$, to decrease with time. If the right Bell state can be created, this no-jump back-action can be mitigated by teleporting the quantum information to a new logical encoding with a larger $\alpha$. For example, if a first logical qubit initially starts with a cat size of $\alpha_0$ and the first logical qubit has an energy loss rate $\kappa_c$, then after time t, the cat will have shrunk to an effective $$\alpha' = \alpha_0 e^{-\kappa_c t/2}.$$

Figure 11:
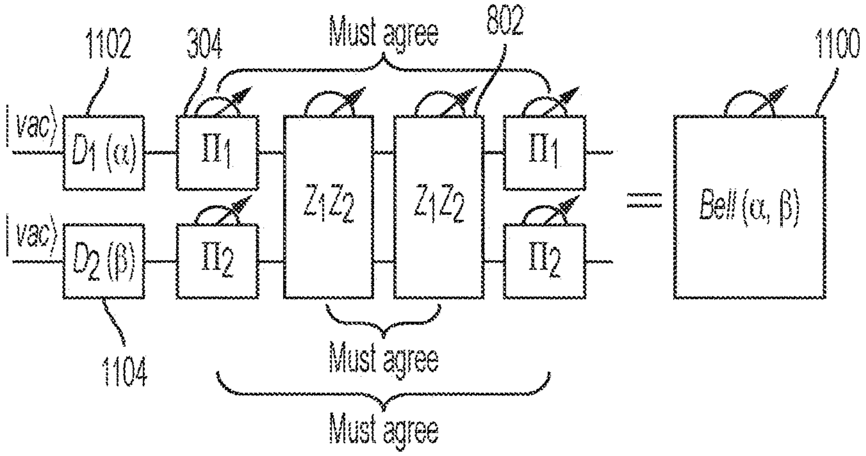
FIG. 11 is a schematic diagram of an illustrative quantum circuit for preparing a Bell state, in accordance with some embodiments of the technology described herein.

By generating a Bell state between a qubit in a logical basis with $\alpha=\alpha'$ and a qubit in the same or another logical basis with $\alpha=\alpha_0$, a suitable Bell state to correct for no-jump back-action can be created. The quantum circuit 1100 of FIG. 11 illustrates a fault tolerant preparation of a Bell state for this purpose, in accordance with some embodiments.

The quantum circuit 1100 begins with the preparation of two arbitrary states in two logical qubits. The first logical qubit may be displaced by displacement 1102 ($D_1(\alpha)$) and the second logical qubit may be displaced by displacement 1104 ($D_2(\beta)$) to prepare two quantum states in the first and second logical qubits. In some embodiments, the first and second logical qubits can have states initialized that are in different logical bases. In the example of FIG. 11, the first logical qubit is in a cat code of "size" $\alpha$ while the second logical qubit is in a cat code of size $\beta$. Preparing the two logical qubits in different logical bases allows for the correction of no-jump back-action.

Thereafter, two parity measurements 304 may be performed, as described in connection with FIGS. 3A-3D, one on each of the first and second logical qubits. Quantum circuit 1100 may then continue with two sequential ZZ measurements, as described in connection with FIGS. 8A-9C. Thereafter, two additional parity measurements 304 may be performed on each of the first and second logical qubits. As described herein, to ensure fault tolerant generation of the Bell state, the first parity measurements 304 and the second parity measurements 304 must agree for each of the first and second logical qubits. Additionally, both of the ZZ measurements 802 must also agree to ensure fault tolerance.

Figure 12:
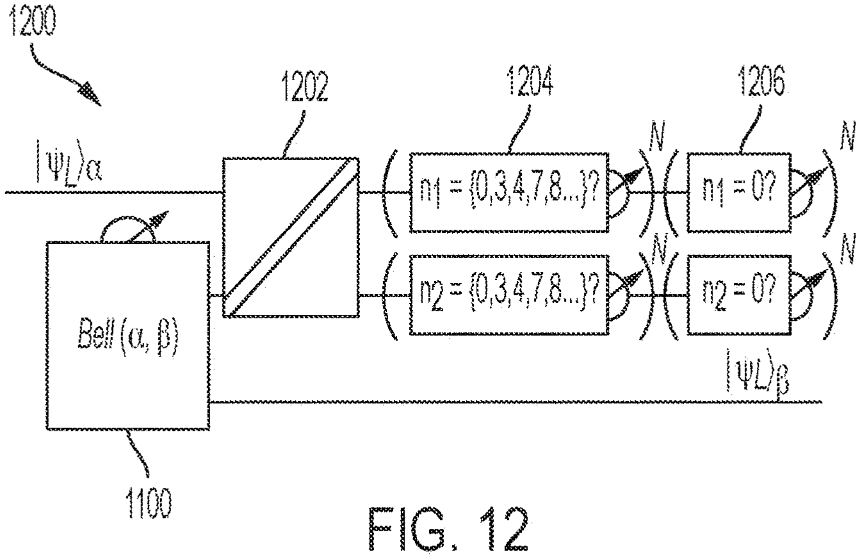
FIG. 12 is a schematic diagram of an illustrative quantum circuit for performing telecorrection, in accordance with some embodiments of the technology described herein.

The prepared Bell state 1100 may then be used to perform telecorrection of a logical qubit, $|\psi_L\rangle_\alpha$, by performing a measurement in the Bell basis, as depicted in the quantum circuit of FIG. 12. A beamsplitter interaction 1202 may first be enacted between the first qubit, prepared with a cat code size of $\alpha$, of the Bell state 1100 and the logical qubit $|\psi_L\rangle_\alpha$. Both the first qubit of the Bell state 1100 and the logical qubit may then be measured in the Z basis of the 4-legged cat code using measurement 1204. The measurement 1204 may be, in some embodiments, equivalent to the measurement 502 described in connection with FIG. 5 herein. Thereafter, both the first qubit of the Bell state 1100 and the logical qubit may be measured in the XX basis of the 4-legged cat code using measurements 1206, which may be equivalent to the measurements 606 described in connection with FIG. 6 herein. These measurements then teleport the quantum information originally stored in the logical qubit. $|\psi_L\rangle$, to the second qubit of the Bell state 1100 which has a cat code of size $\beta$, correcting for no-jump backaction and preventing the accumulation of leakage errors over many quantum operations.

Because a beamsplitter conserves the total photon number parity (i.e., it conserves the number of photons), ZZ information may still be extracted by measuring the local photon number parity mod(4) and adding the results to determine the ZZ information. The protocol is fault tolerant because after the beamsplitter, all the logical XX and ZZ information has been mapped to the non-local photon number space of the cavities. While ancilla qubit errors may still dephase the logical qubits during the telecorrection process, at least two photon losses in either cavity are required to yield an incorrect measurement outcome.

Figure 13:
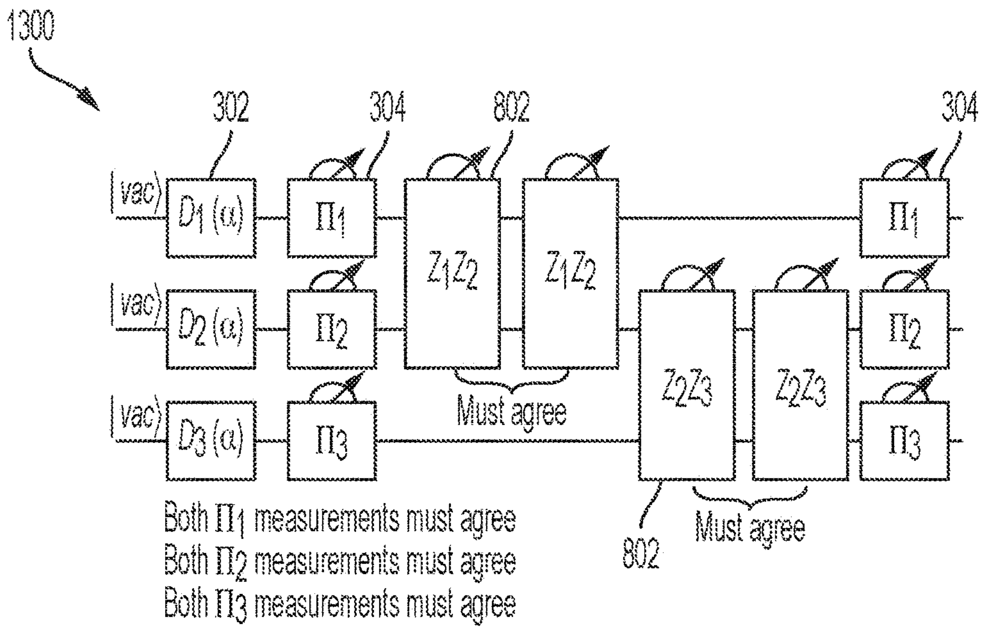
FIG. 13 is a schematic diagram of an illustrative quantum circuit for preparing Greenberger-Horne-Zeilinger (GHZ) cluster states, in accordance with some embodiments of the technology described herein.

One potentially useful subroutine, specifically for cluster-state models of quantum computing, is the creation of Greenberger-Horne-Zeilinger (GHZ) entangled states such as $|000\rangle+|111\rangle$ and $|{+}{+}{+}\rangle+|{-}{-}{-}\rangle$. FIG. 13 is a schematic diagram of an illustrative quantum circuit 1300 for preparing the $|000\rangle+|111\rangle$ GHZ cluster states, in accordance with some embodiments described herein. The quantum circuit 1300 begins by preparing three arbitrary states in three logical qubits by applying displacements 302 ($D_1(\alpha)$. $D_2(\alpha)$, $D_3(\alpha)$) to each logical qubit. Thereafter, parity measurements 304 are performed on each of the logical qubits. A first pair of ZZ measurements 802 are performed on the first and second qubits, and a second pair of ZZ measurements 802 are subsequently performed on the second and third qubits. Finally, parity measurements 304 are performed on each of the logical qubits. As before, in order to provide fault tolerance, the first and last parity measurements must agree, the first pair of ZZ measurements 802 must agree, and the second pair of ZZ measurements 802 must agree in order to prepare the $|000\rangle+|111\rangle$ GHZ cluster state.

Figure 14:
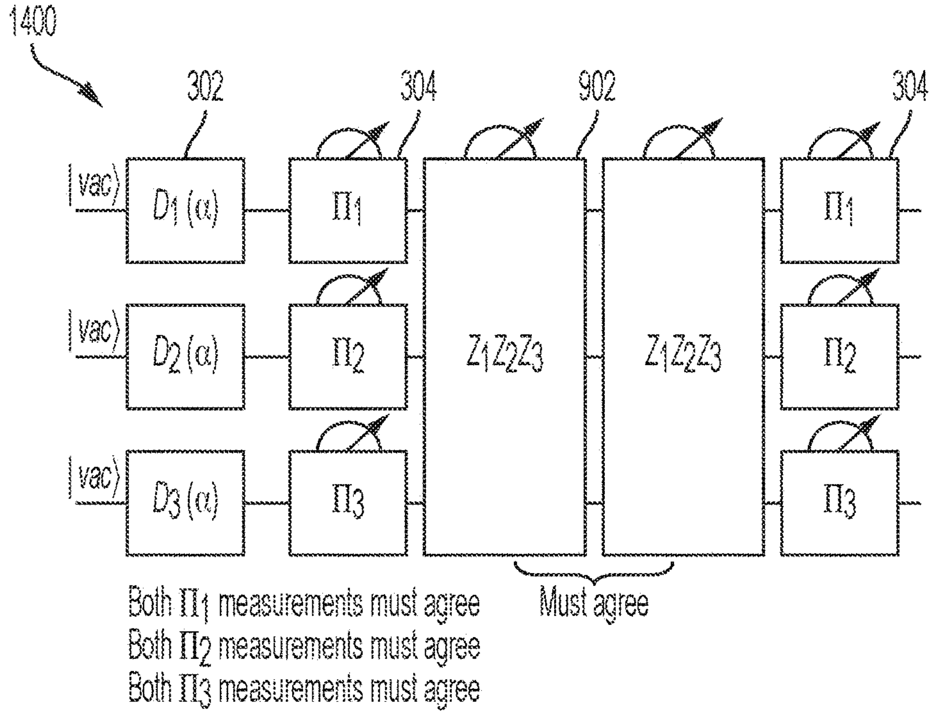
FIG. 14 is a schematic diagram of another illustrative quantum circuit for preparing GHZ cluster states, in accordance with some embodiments of the technology described herein.

FIG. 14 is a schematic diagram of another illustrative quantum circuit 1400 for preparing the $|{+}{+}{+}\rangle+|{-}{-}{-}\rangle$ GHZ cluster state, in accordance with some embodiments described herein. Quantum circuit 1400 is similar to quantum circuit 1300 of FIG. 13, but instead of the two pairs of ZZ measurements 802, a pair of ZZZ measurements 902 are performed between the two sets of parity measurements 304. In this instance, each of the ZZZ measurements 902 must agree in order to preserve fault tolerance.

Combining GHZ state preparation with Bell state measurements enables the performance of fault tolerant CNOT gates between logical qubits. As with most teleported gate protocols, this can be divided into two steps: the creation of a suitable entangled state followed by Bell measurements between this entangled state and the logical qubits to simultaneously teleport the information onto the remaining unmeasured qubits and perform the gate. This gate may be performed up to some Pauli corrections, which depend on the measurement outcomes.

Figure 15:
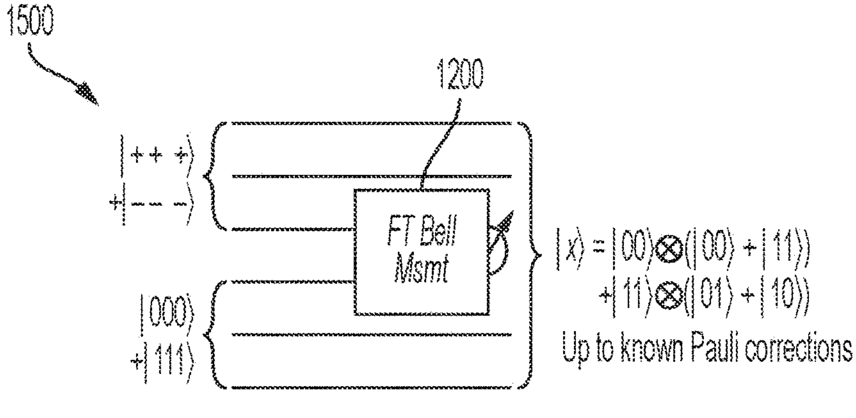
FIG. 15 is a schematic diagram of an illustrative quantum circuit for preparing a $|\chi\rangle$ state, in accordance with some embodiments of the technology described herein.

To prepare the CNOT gate, first a $|\chi\rangle$ state may be prepared, as depicted in the example of quantum circuit 1500 of FIG. 15. The $|\chi\rangle$ state may be described as $CNOT_{23}(|\Omega_{12}\rangle\otimes|\Psi_{34}\rangle)$, where $|\chi\rangle$ is the Bell state $(|00\rangle+|11\rangle)/\sqrt{2}$. To prepare the $|\chi\rangle$ state, the two different types of GHZ states are fused together with the fault tolerant Bell measurement 1200. The Bell measurement between qubits 3 and 4 projects the remaining qubits into the $|\chi\rangle$ state, up to local Pauli operations determined by the Bell measurement outcome. This is equivalent to building a larger cluster state from two smaller building blocks.

Figure 16:
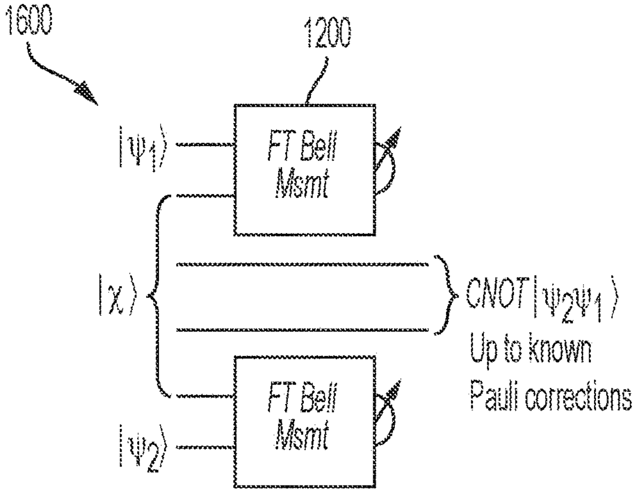
FIG. 16 is a schematic diagram of an illustrative quantum circuit for teleporting a CNOT gate, in accordance with some embodiments described herein.

Once the $|\chi\rangle$ state has been prepared, it may be used to teleport a CNOT gate as shown in the quantum circuit 1600 of FIG. 16, in accordance with some embodiments. The CNOT gate may be teleported using Bell measurements 1200 between the pairs of logical qubits 1 and 2 and logical qubits κ and 6. The output of the quantum circuit 1600 is stored as logical information on unmeasured qubits 3 and 4, and the Bell measurement outcomes indicates which, if any, Pauli corrections should be applied to the output, $CNOT|\psi_2\psi_1\rangle$. It should be appreciated that there may be more efficient ways to compile a quantum circuit with CNOT gates that reduce the number of operations and measurements, but this explicit construction is useful for proving that the set of operations described herein is indeed universal.

Figure 17A:
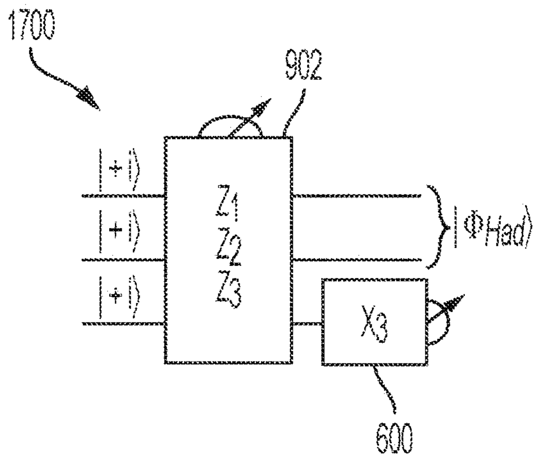
FIG. 17A is a schematic diagram of a simplified quantum circuit for preparing a $|\Phi_{Had}\rangle$ state, in accordance with some embodiments of the technology described herein.
Figure 17B:
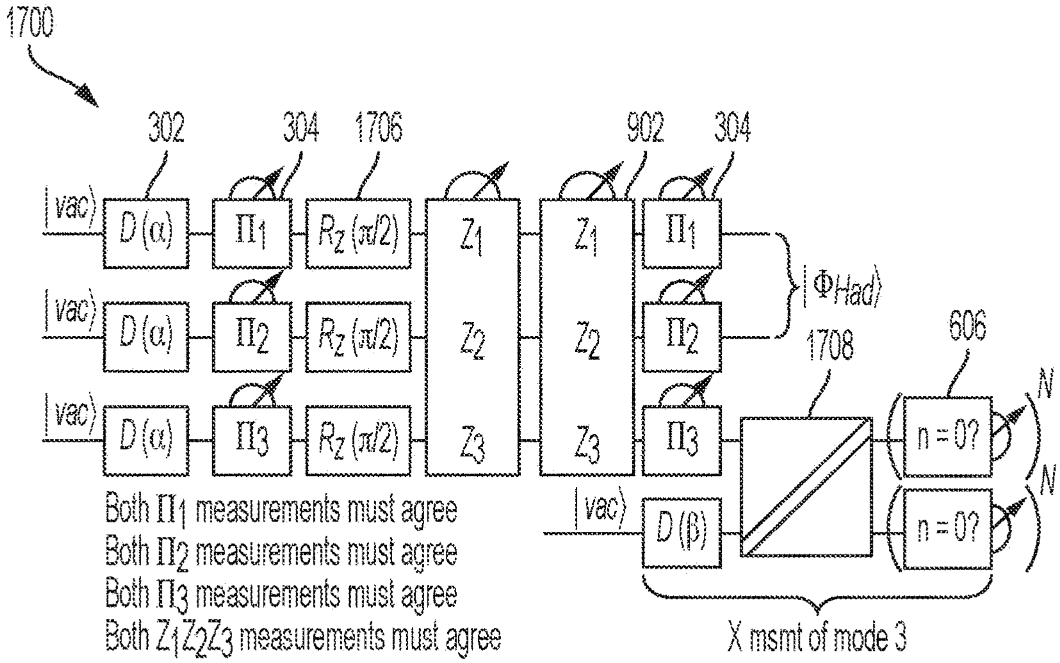
FIG. 17B is a detailed schematic diagram of the quantum circuit of FIG. 17A, in accordance with some embodiments of the technology described herein.

Combining state preparation with Bell state measurements also enables the performance of fault tolerant Hadamard gates between two logical qubits. FIG. 17A is a schematic diagram of a quantum circuit 1700 for preparing a Hadamard state, $|\Phi_{Had}\rangle$, in accordance with some embodiments. An expanded version of this quantum circuit 1700 is depicted in FIG. 17B.

The precursor two-qubit entangled state is an eigenstate of the XZ operator, notated as $|\Phi_{Had}\rangle$. This state can also be written as $|0+\rangle\pm|1-\rangle$, $|{+}i{+}i\rangle\pm i|{-}i{-}i\rangle$, or $H_2|\psi_{12}\rangle$. The quantum circuit 1700 utilizes three logical qubits initially in the |vac\ket state. Each qubit is displaced into a coherent state by displacements 302, and rotations 1706 of $\pi/2$ place the three logical qubits in the $|{+}i\rangle$ state. The rotations 1706 may be performed using a fault tolerant SNAP gate or a switchable Kerr gate, in some embodiments. A ZZZ measurement 902 is first performed on the three logical qubits using fault tolerant parity measurements 304 and ZZZ measurements 902, yielding the state $|{+}i{+}i{+}i\rangle\pm|{-}i{-}i{-}i\rangle$. Disagreeing sets of measurements indicate a first order error has occurred and the protocol should be restarted.

Thereafter, one of the qubits is measured destructively in the X basis using measurement 600, which utilizes an additional ancilla qubit initialized in a different logical basis than the three logical qubits. The measurement 600 includes enacting a beamsplitter interaction 1708 between one of the logical qubits and the ancilla qubit and then destructively measuring out the states of the logical qubit and the ancilla qubit using measurements 606. Measuring this logical qubit destructively in the X basis projects the two-qubit state of the other two logical qubits onto the state $|{+}i{+}i\rangle\pm i|{-}i{-}i\rangle$, where the sign is determined by both the outcomes of the ZZZ measurement 902 and the X measurement 600.

Figure 18:
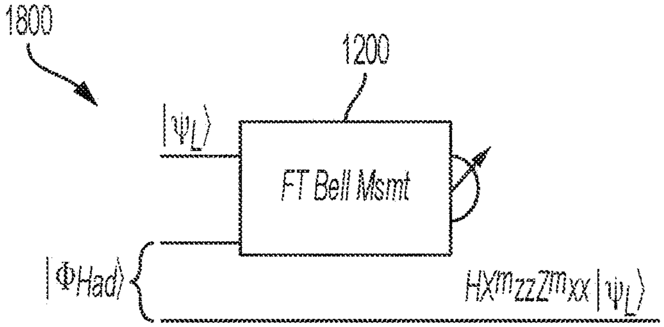
FIG. 18 is a schematic diagram of a quantum circuit configured to teleport a Hadamard gate, in accordance with some embodiments of the technology described herein.

After preparing the $|\Phi_{Had}\rangle$ state, it may be used to teleport a single-qubit Hadamard gate onto another logical qubit, as depicted in the quantum circuit 1800 of FIG. 18. In some embodiments, the quantum circuit 1800 includes the performance of a fault tolerant Bell measurement 1200 between a logical qubit with the state $|\psi_L\rangle$ and a qubit of the two-qubit $|\Phi_{Had}\rangle$ state. By performing the fault tolerant Bell measurement 1200, the single-qubit Hadamard gate may be teleported onto the remaining logical qubit of the two-qubit $|\Phi_{Had}\rangle$ state. After performing the fault tolerant Bell measurement 1200, the second qubit of the two-qubit $|\Phi_{Had}\rangle$ state may now store the quantum state $HX^{m_{ZZ}}Z^{m_{XX}}|\psi_L\rangle$.

The protocol described in connection with FIGS. 17A-18 utilizes at minimum five logical qubits (e.g., five microwave cavity resonators) with ancilla qubits coupled to each of them. It should be appreciated that this implementation of the Hadamard gate is not particularly Hardware efficient, but in combination with the CNOT and $R_Z\theta$ operations, shows that the above-described set of quantum operations is universal.

IV. State Purification Using SWAP Tests

Purification via SWAP tests refers to a general method for symmetrizing general qubits. The inventors have recognized and appreciated that this method can be used to prepare states in bosonic qubits with high fidelity. In particular, non-destructive SWAP tests between pairs of states may be used to reduce errors when generating a number of copies of a target state using a procedure that is prone to errors (e.g., it is noisy). The SWAP test outcomes can then be postselected to reduce errors in state generation.

This is a stand-alone procedure that can be used for general state preparation in a bosonic mode to reduce the effects of stochastic errors in the state preparation. It may be particularly useful to prepare $|\pm i\rangle$ and $|T\rangle$ states in the measurement-based scheme described herein as an alternative to using fault tolerant SNAP gates as the non-Clifford operations. Rather than implementing a direct fault tolerant gate (e.g., a SNAP gate), fault tolerant measurements can be used instead to purify noisy states produced by some other means (e.g., optimal control pulses or state transfer from the ancilla to the logical qubit). An advantage of this method is that the noise channel can be complicated and different for each input cavity state.

The SWAP test measurement can be made fault tolerant to first order errors, and therefore the initial state preparation error may be much larger than the SWAP test error. Under these conditions, SWAP tests can be used to purify the initial states and reduce the state preparation error. The process begins by preparing N noisy copies of the desired quantum state to be initialized. For simplicity it can be assumed that there is a probability $p_{err}$ of some error and probability $(1-p_{err})$ of no error occurring in the state preparation. When performing a SWAP test measurement between two of these cavities, there is a small probability, $p_{err}/2$, that the measurement outcomes would indicate failure and the protocol must be restarted. But most of the time the SWAP test measurements succeed, resulting in two logical qubits with error probability $p_{err}/2$. This direct trade-off of success probability for state fidelity is very favorable.

By repeating the SWAP test over all different pairings of the cavities, the error probability may be reduced, when the SWAP test measurement is successful, until a limit set by the fidelity of the SWAP test measurement is reached. Since the SWAP test can be performed fault tolerantly, in principle this technique can be used to prepare cavity states with high fidelity.

Figure 19:
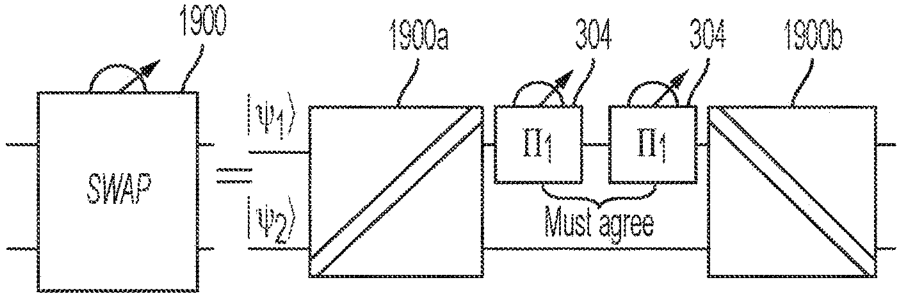
FIG. 19 is a schematic diagram of an illustrative quantum circuit for the fault tolerant implementation of the SWAP test between a first and second qubit, in accordance with some embodiments of the technology described herein.

To illustrate this method, the construction of a single fault tolerant SWAP test measurement from universal operations is described. FIG. 19 is a schematic diagram of an illustrative quantum circuit 1900 for the fault tolerant implementation of the SWAP test between a first and second qubit, in accordance with some embodiments. The SWAP test in this context is a non-destructive measurement of the SWAP operator between two logical qubits. If $|\psi_1\rangle$ and $|\psi_2\rangle$ are the initial input states, then the SWAP test will project these states into $(|\psi_1\psi_2\rangle \pm |\psi_2\psi_1\rangle)/\sqrt{2}$ because symmetric and anti-symmetric superpositions are the ±1 eigenstates of the SWAP operator.

To perform this measurement, a 50-50 beamsplitter interaction 1900*a* is first enacted between the two logical qubits. Thereafter, the photon number parity of one of the modes is measured in the "beamsplitter" frame using parity measurements 304. Normally a parity measurement on a single logical qubit would measure the parity operator $$e^{i\pi a_1^\dagger a_1},$$

but in the beamsplitter frame the transformation $a_1 \to (a_1 + a_2)/\sqrt{2}$ is made such that the parity measurements 304 are measuring the SWAP operator $$e^{i\frac{\pi}{2}(a_1^\dagger + a_2^\dagger)(a_1 + a_2)}.$$

After performing the parity measurements 304, another 50-50 beamsplitter interaction 1900*b* is enacted. The last beamsplitter 1900*b* is an inverse 50-50 beamsplitter implemented by inverting the phase of one of the beamsplitter pumps. This sequence of operations is equivalent to a parity measurement in the beamsplitter frame.

At face value, the outcomes of the SWAP test are rather simple to interpret. If the obtained outcome is +1 (i.e., the ancilla qubit is in the $|g\rangle$ state), it is more likely that the two input states are identical $|\psi_1\rangle$ and $|\psi_2\rangle$ and therefore error-free. By post-selecting on this outcome, the probability that either state has an error is accordingly reduced.

The probability of obtaining the outcome ±1 is $1 \pm |\langle\psi_1|\psi_2\rangle|^2/2$. If one of the states has suffered an error in the initial preparation, then it is likely that $|\langle\psi_1|\psi_2\rangle|=0$ for a wide range of possible errors. Additionally, obtaining the outcome +1 does not guarantee that an error did not occur. If $|\langle\psi_1|\psi_2\rangle|=0$, the outcome of +1 may still be obtained with a probability of 0.5. Because of this, when the SWAP test is passed, the error in both cavity states drops by half but is never completely eliminated.

This can be expressed more precisely with the density matrix formalism. The initial noisy cavity states can be written as:

$$\rho_{init} = (1 - p_{err})|\psi_t\rangle\langle\psi_t| + p_{err}\Sigma_i p_i|\psi_i\rangle\langle\psi_i|$$

where $|\psi_t\rangle$ is the target state that is to be prepared with high fidelity and $|\psi_i\rangle$ are states that are obtained when there are errors in the initial preparation for which $\langle\psi_i|\psi_t\rangle=0$ and $p_i$ are real scalars that sum to 1.

The initial two-cavity state can be written as $$\rho_{init}^{(1)} \otimes \rho_{init}^{(2)}.$$

Obtaining the +1 outcome is equivalent to applying projector (1+SWAP)/2. If the partial trace is taken to first order in $p_{err}$, the states of each logical qubit will each be $\rho_{final}$, where:

$$\rho_{final} = (1 - p_{err}/2)|\psi_t\rangle\langle\psi_t| + p_{err}/2\Sigma_i p_i|\psi_i\rangle\langle\psi_i|$$

Figure 20:
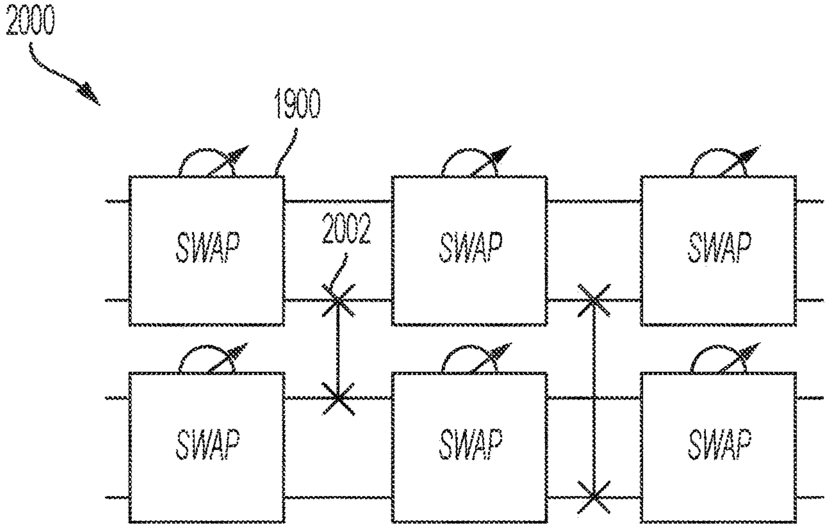
FIG. 20 is a schematic diagram of an illustrative quantum circuit configured to reduce errors present in quantum states prepared in four qubits, in accordance with some embodiments of the technology described herein.

FIG. 20 is a schematic diagram of an illustrative quantum circuit 2000 configured to reduce errors present in quantum states prepared in four qubits, in accordance with some embodiments of the technology described herein. The quantum circuit 2000 includes a number of SWAP tests 1900 and SWAP operations 2002 between pairs of cavities. In the example of FIG. 20, the process begins with four copies of $\rho_{init}$. During the implementation of quantum circuit 2000, the SWAP tests 1900 can be performed between all six permutations of the pairs of logical qubits to reduce the error in each state to $p_{err}/8$. With additional copies of $\rho_{init}$, this error rate could be reduced further at the expense of adding more SWAP tests and SWAP operations. This protocol can be experimentally implemented with the same hardware as the ZZ measurement, as described in connection with FIGS. 8A-8D herein.

V. Correcting for the Kerr Effect and $\chi'$

It may be desirable in some quantum information processing schemes to account for additional effects that may introduce perturbations to the quantum system. For example, the Kerr effect and the effect of $\chi'$ may cause effects that perturb the ZZ and/or ZZZ measurements described herein so that they are not as robust. These effects are particularly pronounced for systems utilizing a large number of photons (e.g., greater than or equal to 10 photons), because the frequency of measured transitions between states of the ancilla qubit depends on the number of photons that are stored in the logical qubit. For example, the $\chi'$ effect scales quadratically with the number of photons that are stored in the logical qubit such that the $\chi'$ effect is more difficult to distinguish and correct for higher photon numbers. These effects are particularly important to account for in MBQC, where larger numbers of photons are used to perform computational processes.

The Kerr effect and the effect of $\chi'$ may be described by the last two terms of the following two-qubit Hamiltonian:

$$\frac{H}{\hbar} = g_{bs}\left(\hat{a}^\dagger\hat{b} + \hat{a}\hat{b}^\dagger\right) + \chi\hat{a}^\dagger\hat{a}|f\rangle\langle f| + \chi\hat{a}^\dagger\hat{a}^\dagger\hat{a}\hat{a}|f\rangle\langle f| + \frac{\kappa}{2}\hat{a}^\dagger\hat{a}^\dagger\hat{a}\hat{a}$$

Figure 21:
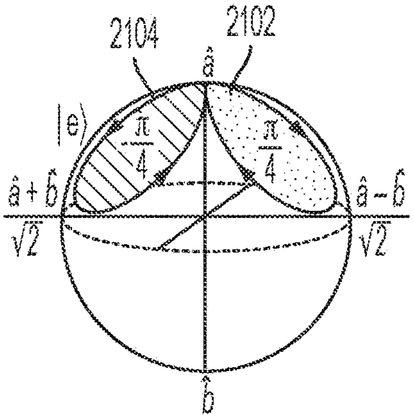
FIG. 21 is a schematic diagram showing the effects of the Kerr effect and $\chi'$ on a quantum state, in accordance with some embodiments of the technology described herein.

FIG. 21 is a schematic diagram of the Bloch sphere showing the effects of the Kerr effect and χ' on a quantum state, in accordance with some embodiments. These two effects lead to perturbations 2102 and 2104 around the Bloch sphere which may reduce the robustness of the ZZ and/or ZZZ measurements described herein and increase the probability of decoherence during a quantum circuit.

Figure 22A:
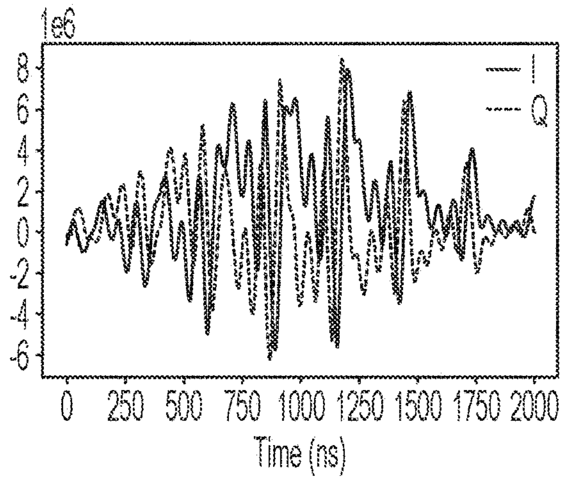
FIG. 22A is a plot illustrating an example of a drive waveform generated using a frequency comb, in accordance with some embodiments of the technology described herein.
Figure 22B:
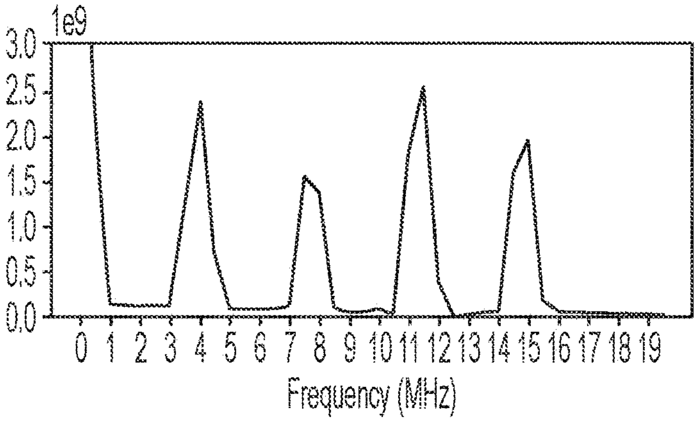
FIG. 22B is a plot illustrating a Fourier transform of the drive waveform of FIG. 22A, in accordance with some embodiments of the technology described herein.

To counteract these effects, quantum states stored in the logical qubits may be prepared using an alternative process and quantum operations may similarly be altered. In some embodiments, the cat state may be prepared by first displacing the state of the logical qubit from the vacuum state, |vac⟩, to the state |α⟩. Thereafter, the |α⟩ state may be driven to the $|0\rangle_L$ state using a drive waveform comprising a selective g–f π-pulse comb. The selective g–f π-pulse comb may be a π-pulse comprising a plurality of frequencies corresponding to the frequencies (0χ, 4χ, 8χ, 12χ, . . . ). The use of these selective frequencies in the g–f π-pulse comb addresses the effects of χ', while changing the phases of the component π-pulses addresses the Kerr effect perturbations because those provide a quadratic correction to the equal spacing of the energy levels of the logical qubit. An example of a selective g–f π-pulse comb is shown in FIG. 22A, and a corresponding Fourier spectrum is shown in FIG. 22B.

Figure 23A:
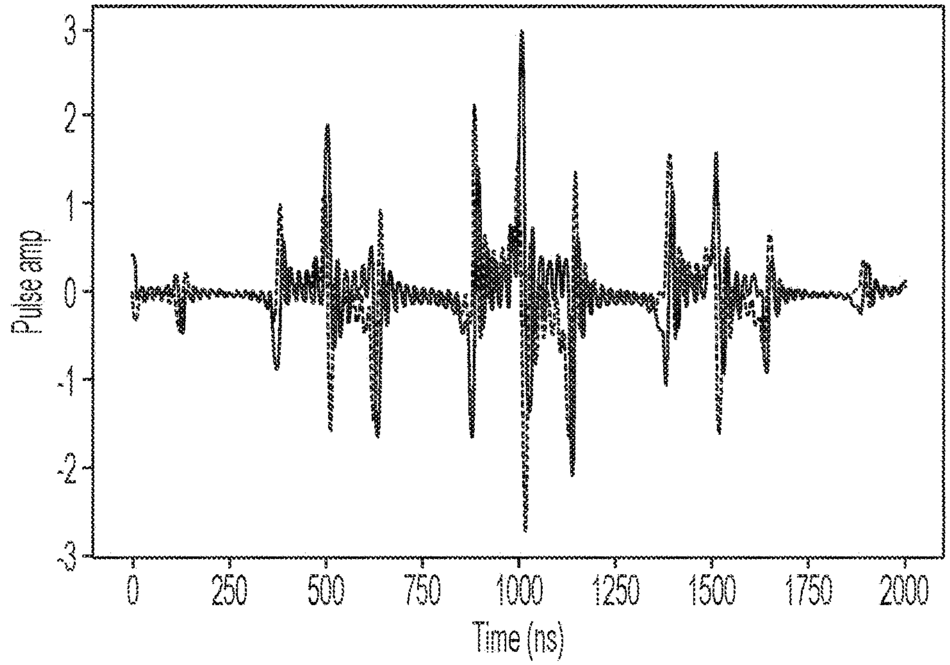
FIG. 23A is a plot illustrating another example of a drive waveform generated using a frequency comb, in accordance with some embodiments of the technology described herein.
Figure 23B:
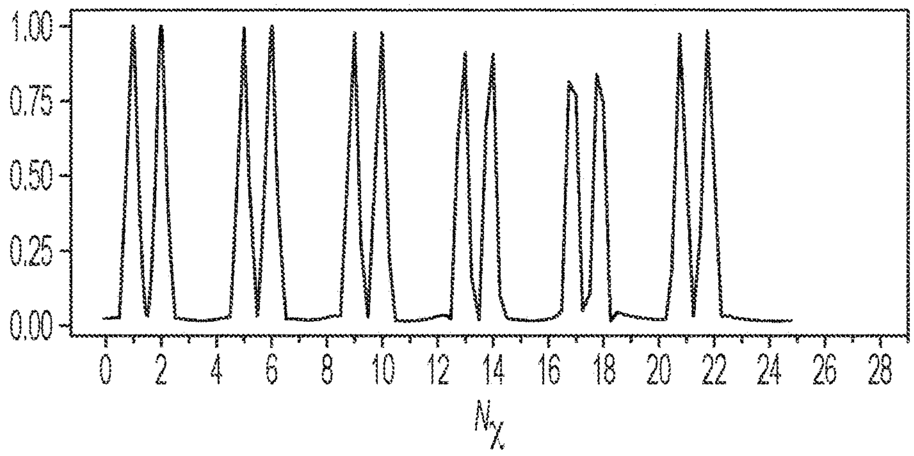
FIG. 23B is a plot illustrating a Fourier transform of the drive waveform of FIG. 23A, in accordance with some embodiments of the technology described herein.

Measurements may also be adjusted to counteract the effects of χ' and the Kerr effect, in some embodiments. For example, XX and ZZ information may be extracted simultaneously to perform a Bell measurement using a three-level ancilla qubit (e.g., a three-level transmon qubit). Three measurements may be performed to extract this information. In some embodiments, these measurements may be performed simultaneously. First, information associated with the |f⟩ state may be measured using a selective Raman transition. Second, information associated with the |e⟩ state may be measured by driving the ancilla qubit with a drive waveform comprising a π-pulse comprising a selective frequency comb having the frequencies of (3χ, 4χ, 7χ, 8χ, . . . ). Third, information associated with the |g⟩ state may be measured by driving the ancilla qubit with a drive waveform comprising a π-pulse comprising a selective frequency comb having the frequencies of (1χ, 2χ, 5χ, 6χ, . . . ). An example of such a drive waveform including both frequency combs to prove the |e⟩ and |g⟩ states is shown in FIG. 23A. A corresponding Fourier transform is shown in FIG. 23B.

Figure 24:
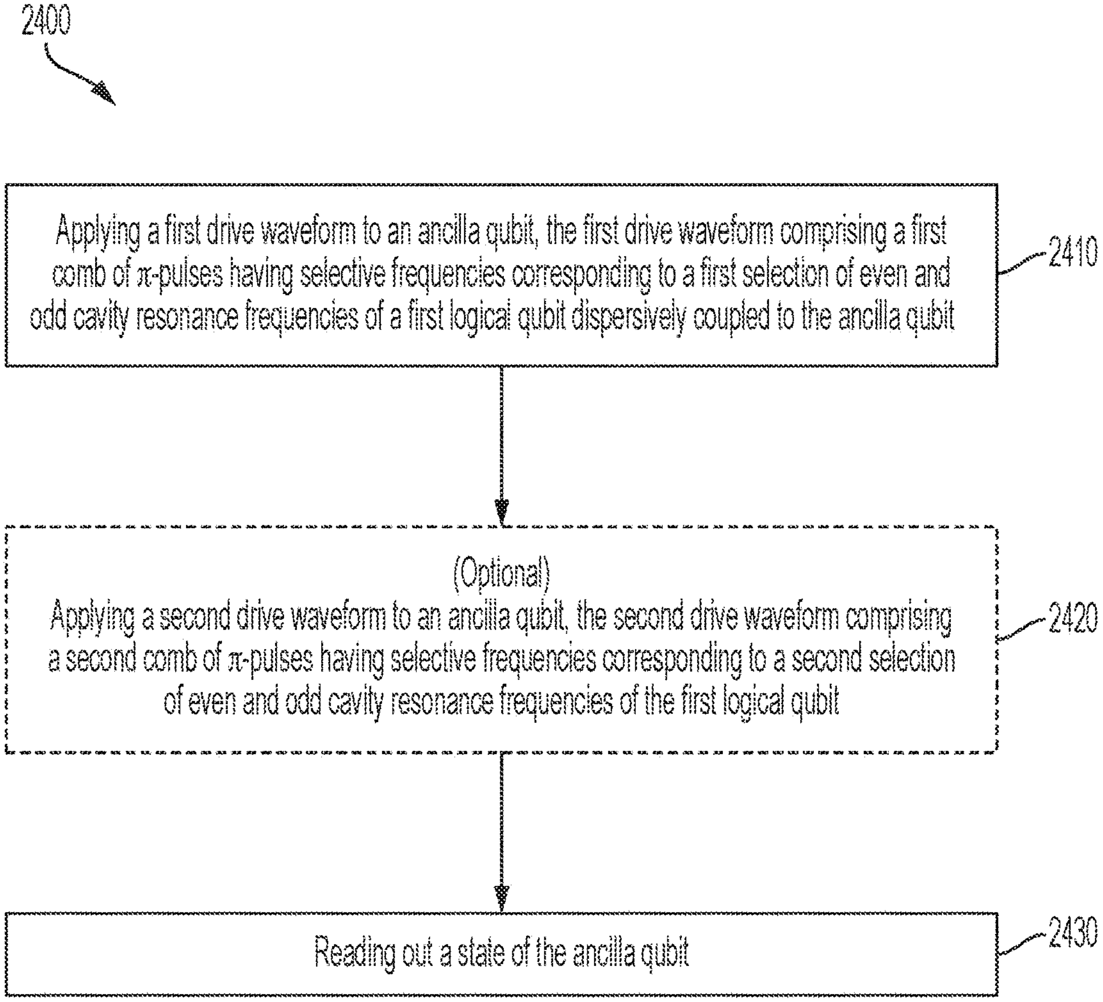
FIG. 24 is a flowchart describing another process 2400 for performing a quantum operation, in accordance with some embodiments of the technology described herein.

FIG. 24 is a flowchart describing another process 2400 for performing a quantum operation, in accordance with some embodiments of the technology described herein. The process 2400 may be used to operate, for example, a quantum information processing system comprising circuit quantum electrodynamics components. The quantum information processing system may include an ancilla qubit (e.g., a transmon qubit, a SNAILmon qubit, an oscillator, or another qubit) coupled to a first logical qubit (e.g., a microwave cavity resonator).

In some embodiments, the process 2400 may begin with act 2410, wherein a first drive waveform is generated and applied to the ancilla qubit. The drive waveforms described in connection with process 2400 may be stored on one or more computer readable storage media (e.g., locally or remotely) and may be accessed by a controller. To apply the drive waveforms, the controller may cause an energy source (e.g., a microwave source) to generate the drive waveforms and to transmit the drive waveforms to the ancilla qubit and/or to other components of the quantum information processing system.

In some embodiments, the first drive waveform comprising a first comb of π-pulses having selective frequencies corresponding to a first selection of even and odd cavity resonance frequencies of the first logical qubit. For example, the first comb of π-pulses may have selective frequencies corresponding to the frequencies of (3χ, 4χ, 7χ, 8χ, . . . ).

In some embodiments, the method optionally includes, prior to reading out the state of the ancilla qubit, performing act 2420. Act 2420 may include generating and applying a second drive waveform to the ancilla qubit. The second drive waveform may include a second comb of π-pulses having selective frequencies corresponding to a second selection of even and odd cavity resonance frequencies of the first logical qubit. In some embodiments, the second comb of π-pulses may have selective frequencies corresponding to the selective frequencies of (1χ, 2χ, 5χ, 6χ . . . ).

In some embodiments, after act 2410 or 2420, the process 2400 may proceed to act 2440 wherein a state of the ancilla qubit may be read out. In some embodiments, the state of the ancilla qubit may be read out using a read-out cavity or microwave strip resonator coupled to the ancilla qubit. To readout the state of the ancilla qubit, a measurement of the state of the ancilla qubit may be made. For example, a destructive measurement of the state of the ancilla qubit may be made. In some embodiments, this measurement may be made, for example, using a microwave radiation detector capable of distinguishing between the possible states of the read-out cavity or microwave strip resonator. For example, the microwave radiation detector may be a homodyne detector or a heterodyne detector, in some embodiments.

In some embodiments, performing the quantum operation comprises measuring a Bell state between the first logical qubit and a second logical qubit. In such embodiments, the quantum electrodynamics system further comprises a second logical qubit coupled to the first logical qubit by a first beamsplitter. For example, the first logical qubit and the second logical qubit may each be microwave cavity resonators coupled by the first beamsplitter. The method may include, prior to reading out the state of the ancilla qubit, applying a third drive waveform to the first beamsplitter to enact a detuned beamsplitter interaction between the first logical qubit and the second logical qubit. Thereafter, the process 2400 may proceed with act 2440 as described above.

In some embodiments, the process 2400 additionally includes generating a first four-qubit cluster state. The four-qubit cluster state may be generated at least in part by applying a fourth drive waveform to a second beamsplitter coupling the first logical qubit and a third logical qubit to enact a beamsplitter interaction between the first logical qubit and the third logical qubit. Additionally, the four-qubit cluster state may be generated by applying a fifth drive waveform to a third beamsplitter coupling the second logical qubit to a fourth logical qubit. In this manner, the quantum states stored in the four logical qubits may be entangled to create a four-qubit cluster state.

In some embodiments, the process 2400 additionally includes generating a many-qubit cluster state. The many-qubit cluster state may be, for example, the XZZX cluster state as described herein, or it may be any other many-qubit cluster state suitable for MBQC. The many-qubit cluster state may be generated, at least in part by, applying a sixth drive waveform to a fourth beamsplitter coupling the first logical qubit of the first four-qubit cluster state and a first logical qubit of a second four-qubit cluster state.

VI. Cluster State Preparation

The inventors have recognized and appreciated that the above-described quantum operations may be used to generate cluster states appropriate for MBQC. The cluster states, once generated, may then be used to perform computations by measuring the qubits in certain bases. Alternatively or additionally, cluster states are useful for quantum communication and networking.

Figure 25A:
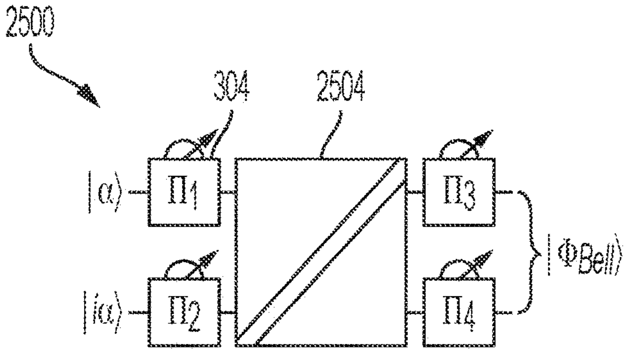
FIG. 25A is a schematic diagram of another illustrative quantum circuit configured to prepare a Bell state in two qubits, in accordance with some embodiments of the technology described herein.
Figure 25B:
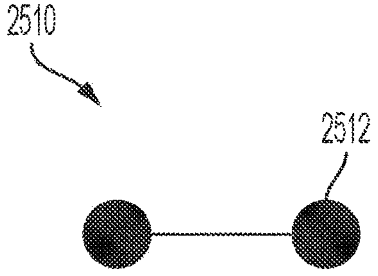
FIG. 25B is a schematic diagram of a two-qubit ZZ Bell state cluster state which may be prepared using the quantum circuit of FIG. 25A, in accordance with some embodiments of the technology described herein.

FIG. 25A is a schematic diagram of an illustrative quantum circuit 2500 configured to prepare a Bell state in two qubits, in accordance with some embodiments. FIG. 25B is a schematic diagram of a two-qubit ZZ Bell state 2510 which may be prepared using quantum circuit 2500, in some embodiments. The illustration of FIG. 25B includes two qubits 2512 prepared in a first logical basis represented by closed circles. The line connecting the two qubits 2512 represents coupling by entanglement.

The quantum circuit of 2500 begins with two logical qubits prepared in $|\alpha\rangle$ and $|i\alpha\rangle$ states, respectively. The two logical qubits are coupled by a beamsplitter, and the quantum circuit 2500 includes the creation of a beamsplitter interaction 2504 between the two logical qubits. Prior to and after the beamsplitter interaction 2504, parity measurements 304 are used to ensure fault tolerance. The creation of the Bell state, $|\Phi_{Bell}\rangle$ is successful if $\Pi_1+\Pi_2=\Pi_3+\Pi_4$.

Figure 26A:
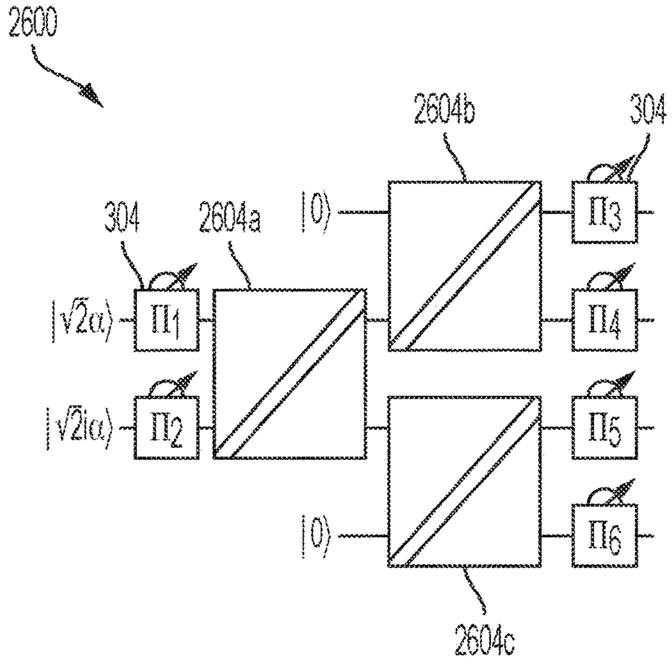
FIG. 26A is a schematic diagram of another illustrative quantum circuit configured to prepare four-qubit cluster state, in accordance with some embodiments of the technology described herein.
Figure 26B:
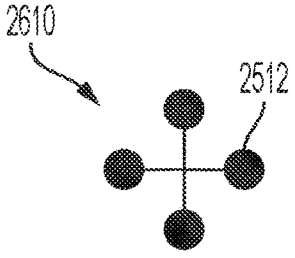
FIG. 26B is a schematic diagram of the four-qubit cluster state which may be prepared using the quantum circuit of FIG. 26A, in accordance with some embodiments of the technology described herein.

One example of a four-qubit cluster state may be created by chaining beamsplitter interactions, as shown in FIG. 26A. FIG. 26B is a schematic diagram of the four-qubit cluster state 2610 which may be generated using the quantum circuit 2600. The quantum circuit 2600 of FIG. 26A begins with two logical qubits prepared in the $|\sqrt{2}\alpha\rangle$ and $|\sqrt{2}i\alpha\rangle$ states. First parity measurements 304 are performed on each of these two logical qubits and then a beamsplitter interaction 2604*a* is enacted between the two logical qubits. Thereafter, each of the two initial logical qubits are coupled to two additional logical qubits prepared in the $|0\rangle$ states by beamsplitter interactions 2604*b* and 2604*c*. Thereafter, second parity measurements 304 are applied to all four logical qubits. The generation of the four-qubit cluster state is successful if $\Pi_1+\Pi_2=\Pi_3+\Pi_4+\Pi_4+\Pi_5+\Pi_6$.

Figure 27A:
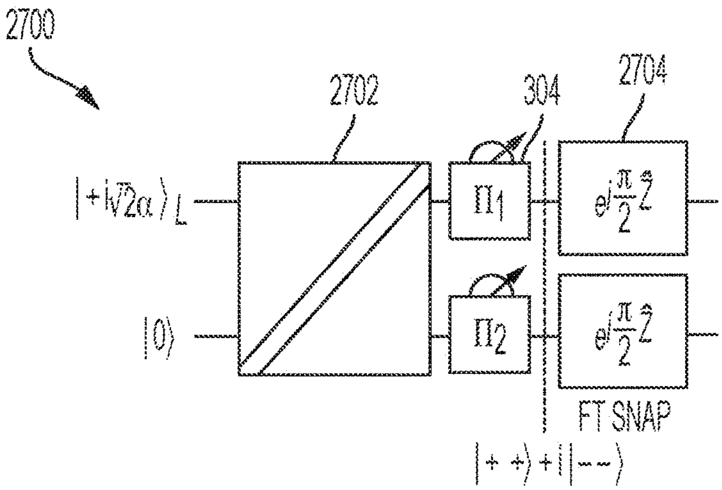
FIG. 27A is a schematic diagram of another quantum circuit configured to generate a two-qubit entangled state, in accordance with some embodiments of the technology described herein.
Figure 27B:
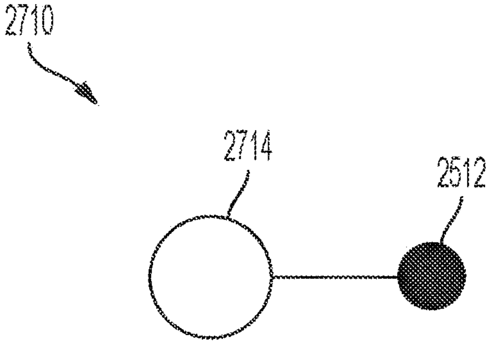
FIG. 27B is a schematic diagram of the two-qubit entangled state which may be prepared using the quantum circuit of FIG. 27A, in accordance with some embodiments of the technology described herein.

Another building block of cluster states for MBQC is a two-qubit cluster consisting of two qubits, each prepared in a different logical basis, by teleporting a Hadamard state. FIG. 27A is a schematic diagram of a quantum circuit 2700 configured to generate the two-qubit entangled state 2710, depicted by FIG. 27B, in accordance with some embodiments. The two-qubit entangled state 2710 includes a first qubit 2512 prepared in a first logical basis (e.g., X) and a second qubit 2714 prepared in a second, different logical basis (e.g., Z).

In some embodiments, the quantum circuit 2700 uses two logical qubits prepared in the $|+i_{\sqrt{2}\alpha}\rangle_L$ and $|0\rangle$ states and first enacts a beamsplitter interaction 2702 between them. Thereafter, parity measurements 304 are performed on each logical qubit, yielding the state $|{++}\rangle+i|{--}\rangle$. Two fault tolerant SNAP operations 2704 are then applied, one to each logical qubit, yielding the $|\Phi_{Had}\rangle=|{+i}{+i}\rangle+i|{-i}{-i}\rangle\equiv|0+\rangle+|1-\rangle$ state.

Figure 28A:
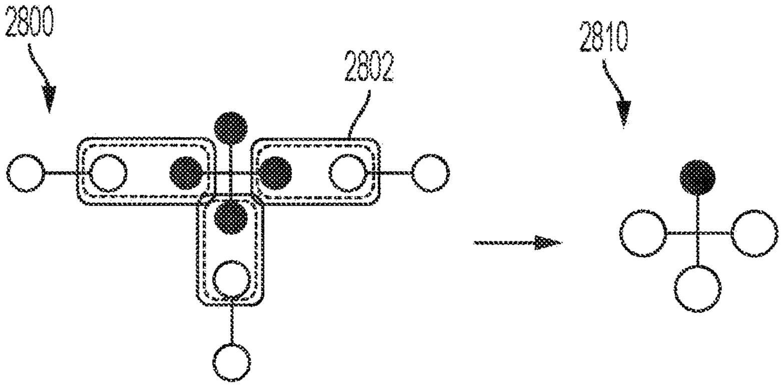
FIG. 28A is a schematic diagram describing another process to generate another four-qubit cluster state, in accordance with some embodiments of the technology described herein.

FIG. 28A is a schematic diagram describing a fusion process which may be used to generate another four-qubit cluster state, in accordance with some embodiments of the technology described herein. The process may start at stage 2800 with four individual cluster states comprising three two-qubit states and one four-qubit state. Bell measurements 2802, which may be any suitable Bell measurements described herein, may be used to "fuse" qubits of each of these smaller resource states to yield the four-qubit cluster state 2810.

Figure 28B:
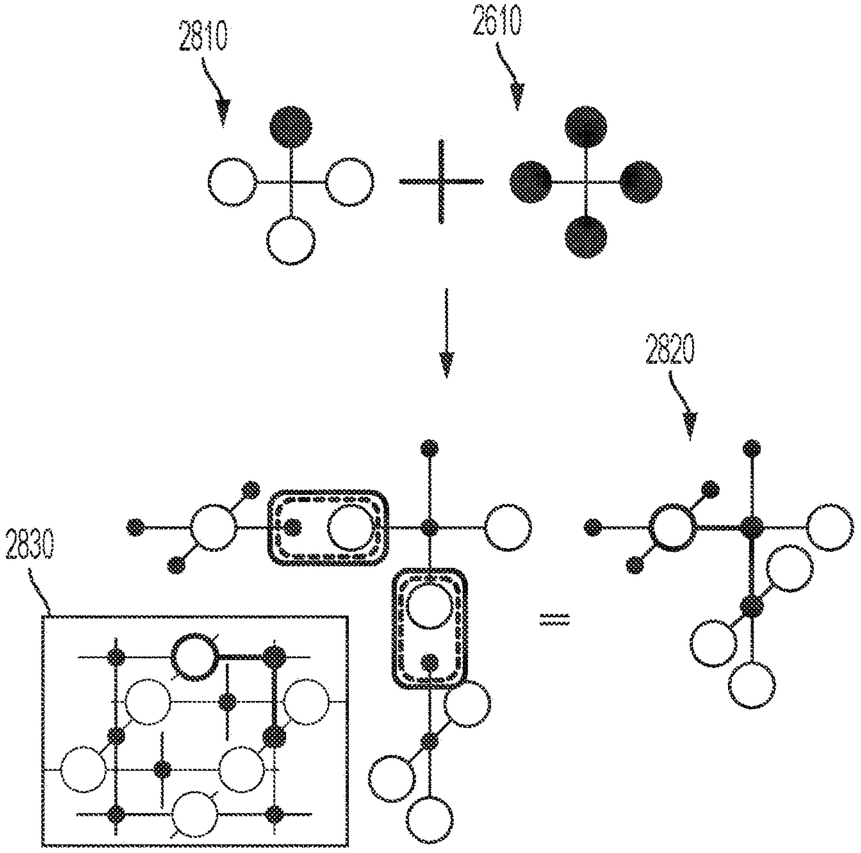
FIG. 28B is a schematic diagram describing the formation of an XZZX cluster state, in accordance with some embodiments of the technology described herein.

Quantum operations, like those described in connection with FIGS. 25A-28B, may be further chained to generate larger cluster states which are useful for MBQC. Such cluster states may include, for example, the XZZX cluster state, described herein, or alternatively or additionally the RHG cluster state. FIG. 28B is a schematic diagram describing the formation of an XZZX cluster state, in accordance with some embodiments of the technology described herein.

As shown in the example of FIG. 28B, four-qubit cluster states 2610 and 2810 may be fused to form larger cluster states such as the cluster state 2820. These larger cluster states may be further fused to create the ultimate cluster state used for MBQC or other applications. As depicted in FIG. 28B, the larger cluster state may be the XZZX cluster state 2830, in some embodiments. Additional aspects of the XZZX cluster state are described in "Tailored cluster states with high threshold under biased noise," by J. Claes, J. Eli Bourassa, and S. Puri, submitted to the ArXiv on Jan. 25, 2022 and located at arXiv:2201.10566, which is incorporated herein by reference in its entirety.

Figure 29:
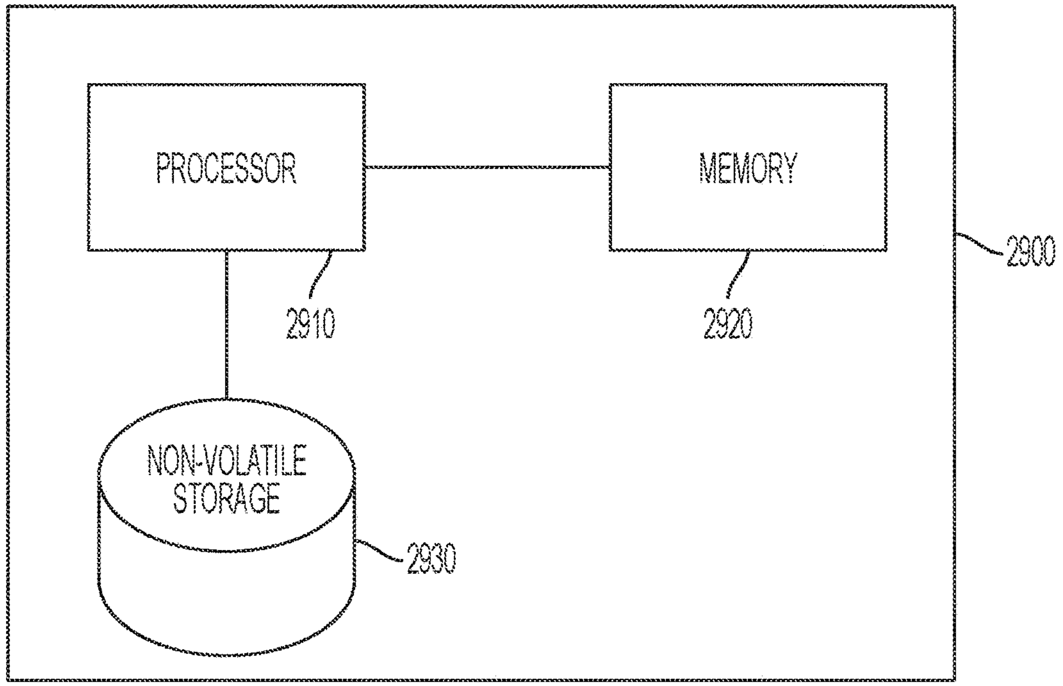
FIG. 29 is a schematic diagram of an illustrative conventional computer system, in accordance with some embodiments of the technology described herein.

An illustrative implementation of a classical computer system 2900 that may be used in connection with any of the embodiments of the disclosure provided herein is shown in FIG. 29. In some embodiments, any one of the processes described herein may be implemented on and/or using the computer system 2900. The computer system 2900 may include one or more processors 2910 and one or more articles of manufacture that comprise non-transitory computer-readable storage media (e.g., memory 2920 and one or more non-volatile storage media 2930). The processor 2910 may control writing data to and reading data from the memory 2920 and the non-volatile storage device 2930 in any suitable manner. To perform any of the functionality described herein, the processor 2910 may execute one or more processor-executable instructions stored in one or more non-transitory computer-readable storage media (e.g., the memory 2920), which may serve as non-transitory computer-readable storage media storing processor-executable instructions for execution by the processor 2910.

Having thus described several aspects and embodiments of the technology set forth in the disclosure, it is to be appreciated that various alterations, modifications, and improvements will readily occur to those skilled in the art. Such alterations, modifications, and improvements are intended to be within the spirit and scope of the technology described herein. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize or be able to ascertain using no more than routine experimentation many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments can be implemented in any of numerous ways. One or more aspects and embodiments of the present disclosure involving the performance of processes or methods may utilize program instructions executable by a device (e.g., a computer, a processor, or other device) to perform, or control performance of, the processes or methods. In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above. The computer readable medium or media can be transportable, such that the program or programs stored thereon can be loaded onto one or more different computers or other processors to implement various ones of the aspects described above. In some embodiments, computer readable media may be tangible (e.g., non-transitory) computer readable media. In some embodiments, the computer readable media may comprise a persistent memory.

The terms "program" or "software" are used herein in a generic sense to refer to any type of computer code or set of computer-executable instructions that can be employed to program a computer or other processor to implement various aspects as described above. Additionally, it should be appreciated that according to one aspect, one or more computer programs that when executed perform methods of the present disclosure need not reside on a single computer or processor but may be distributed in a modular fashion among a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone, or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or." as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "approximately" and "about" may be used to mean within ±20% of a target value in some embodiments, within ±10% of a target value in some embodiments, within ±5% of a target value in some embodiments, within ±2% of a target value in some embodiments. The terms "approximately" and "about" may include the target value.

What is claimed is:

1. A method of operating a circuit quantum electrodynamics system comprising an ancilla qubit dispersively coupled to a first logical qubit, the method comprising:
- performing a quantum operation at least in part by:
  - generating and applying a first drive waveform to the ancilla qubit, the first drive waveform comprising a first comb of π-pulses having selective frequencies corresponding to a first selection of even and odd cavity resonance frequencies of the first logical qubit;
  - generating and applying a second drive waveform to the ancilla qubit, the second drive waveform comprising a second comb of π-pulses having selective frequencies corresponding to a second selection of even and odd cavity resonance frequencies of the first logical qubit; and
  - reading out a state of the ancilla qubit.

2. The method of claim 1, wherein:
- the first selection comprises the selective frequencies 3χ, 4χ, 7χ, and 8χ, and
- the second selection comprises the selective frequencies 1χ, 2χ, 5χ, and 6χ.

3. The method of claim 1, wherein the circuit quantum electrodynamics system further comprises a second logical qubit coupled to the first logical qubit by a first beamsplitter, the method further comprising, prior to reading out the state of the ancilla qubit, applying a third drive waveform to the first beamsplitter to enact a detuned beamsplitter interaction between the first logical qubit and the second logical qubit.

4. The method of claim 3, wherein performing the quantum operation comprises generating a Bell state between the first logical qubit and the second logical qubit.

5. The method of claim 3, wherein enacting the detuned beamsplitter interaction between the first logical qubit and the second logical qubit comprises enacting the detuned beamsplitter interaction between a first cavity resonator and a second cavity resonator.

6. The method of claim 3, further comprising generating a first four-qubit cluster state at least in part by:
- applying a fourth drive waveform to a second beamsplitter coupling the first logical qubit and a third logical qubit; and
- applying a fifth drive waveform to a third beamsplitter coupling the second logical qubit to a fourth logical qubit.

7. The method of claim 6, further comprising generating a many-qubit cluster state at least in part by:
- applying a sixth drive waveform to a fourth beamsplitter coupling the first logical qubit of the first four-qubit cluster state and a first logical qubit of a second four-qubit cluster state.

8. The method of claim 1, wherein generating and applying the first drive waveform comprises generating and applying a microwave waveform.

9. The method of claim 1, wherein generating and applying the first drive waveform comprises generating and applying the first drive waveform to a transmon.

10. A quantum information processing system, comprising:
- an ancilla qubit;
- a first logical qubit dispersively coupled to the ancilla qubit; and
- at least one controller configured to:
  - perform a quantum operation at least in part by:
    - generating and applying a first drive waveform to the ancilla qubit, the first drive waveform comprising a first comb of π-pulses having selective frequencies corresponding to a first selection of even and odd cavity resonance frequencies of the first logical qubit;
    - generating and applying a second drive waveform to the ancilla qubit, the second drive waveform comprising a second comb of π-pulses having selective frequencies corresponding to a second selection of even and odd cavity resonance frequencies of the first logical qubit; and
    - reading out a state of the ancilla qubit.

11. The quantum information processing system of claim 10, wherein:
- the first selection comprises the selective frequencies 3χ, 4χ, 7χ, and 8χ, and
- the second selection comprises the selective frequencies 1χ, 2χ, 5χ, and 6χ.

12. The quantum information processing system of claim 10, further comprising a second logical qubit coupled to the first logical qubit by a beamsplitter.

13. The quantum information processing system of claim 12, wherein the at least one controller is further configured to, prior to reading out the state of the ancilla qubit, generate and apply a third drive waveform to the beamsplitter to enact a detuned beamsplitter interaction between the first logical qubit and the second logical qubit.

14. The quantum information processing system of claim 13, wherein the at least one controller being configured to perform the quantum operation comprises the at least one controller being configured to generate a Bell state between the first logical qubit and the second logical qubit.

15. The quantum information processing system of claim 12, wherein the first logical qubit and the second logical qubit comprise a first cavity resonator and a second cavity resonator.

16. The quantum information processing system of claim 10, wherein the first drive waveform comprises a microwave waveform.

17. The quantum information processing system of claim 10, wherein the ancilla qubit comprises a transmon.

* * * * *